US009838740B1

(12) United States Patent
Gilbert

(10) Patent No.: US 9,838,740 B1
(45) Date of Patent: Dec. 5, 2017

(54) ENHANCING VIDEO CONTENT WITH PERSONALIZED EXTRINSIC DATA

(71) Applicant: Amazon Technologies, Inc., Reno, NV (US)

(72) Inventor: Stuart Gilbert, London (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/218,408

(22) Filed: Mar. 18, 2014

(51) Int. Cl.
*H04N 21/458* (2011.01)
*H04N 21/482* (2011.01)
*H04N 21/472* (2011.01)

(52) U.S. Cl.
CPC ......... *H04N 21/458* (2013.01); *H04N 21/472* (2013.01); *H04N 21/482* (2013.01)

(58) Field of Classification Search
None
See application file for complete search history.

(56) References Cited

U.S. PATENT DOCUMENTS

| | | |
|---|---|---|
| 5,260,556 A | 11/1993 | Lake et al. |
| 5,596,705 A | 1/1997 | Reimer et al. |
| 5,691,527 A | 11/1997 | Hara et al. |
| 5,692,212 A | 11/1997 | Roach |
| 5,781,730 A | 7/1998 | Reimer et al. |
| 6,065,042 A | 5/2000 | Reimer et al. |
| 6,556,722 B1 | 4/2003 | Russell et al. |
| 7,103,541 B2 | 9/2006 | Attias et al. |
| 7,293,275 B1 | 11/2007 | Krieger et al. |
| 7,558,865 B2 | 7/2009 | Lin et al. |
| 7,774,075 B2 | 8/2010 | Lin |
| 7,814,521 B2 | 10/2010 | Ou et al. |
| 8,161,082 B2 | 4/2012 | Israel et al. |
| 8,209,396 B1 | 6/2012 | Raman et al. |
| 8,250,605 B2 | 8/2012 | Opaluch |
| 8,365,235 B2 | 1/2013 | Hunt et al. |
| 8,510,775 B2 | 8/2013 | Lafreniere et al. |

(Continued)

FOREIGN PATENT DOCUMENTS

| | | |
|---|---|---|
| EP | 1993282 | 11/2008 |
| EP | 2071578 | 6/2009 |

(Continued)

OTHER PUBLICATIONS

U.S. Appl. No. 13/227,097 entitled "Synchronizing Video Content With Extrinsic Data" and filed Sep. 7, 2011.

(Continued)

*Primary Examiner* — Michael Telan
(74) *Attorney, Agent, or Firm* — Thomas | Horstemeyer, LLP

(57) ABSTRACT

Disclosed are various embodiments that relate to enhancing video content with personalized extrinsic data. A video content feature is rendered on a display. A user interface is rendered on top of the video content feature on the display. The user interface presents cast member indicia, where the cast member indicia correspond to respective cast members in the video content feature. In response to receiving a selection of one of the cast member indicia from a user, the user interface is updated to present additional information about the corresponding cast member. The additional information is personalized based at least in part on profile data associated with the user.

20 Claims, 15 Drawing Sheets

(56) References Cited

U.S. PATENT DOCUMENTS

| | | | |
|---|---|---|---|
| 8,552,983 B2 | 10/2013 | Chiu | |
| 8,644,702 B1 | 2/2014 | Kalajan | |
| 8,689,255 B1 | 4/2014 | Gregov et al. | |
| 8,763,041 B2 | 6/2014 | Timmermann et al. | |
| 8,849,943 B2 | 9/2014 | Huang et al. | |
| 8,955,021 B1 | 2/2015 | Treder et al. | |
| 9,078,030 B2 | 7/2015 | Kuo | |
| 9,113,128 B1 | 8/2015 | Aliverti et al. | |
| 9,241,187 B2 | 1/2016 | Ricci | |
| 2002/0042920 A1* | 4/2002 | Thomas et al. | 725/87 |
| 2002/0059610 A1 | 5/2002 | Ellis | |
| 2003/0050863 A1 | 3/2003 | Radwin | |
| 2004/0002858 A1 | 1/2004 | Attias et al. | |
| 2004/0056097 A1 | 3/2004 | Walmsley et al. | |
| 2004/0133919 A1 | 7/2004 | Incentis | |
| 2004/0197088 A1* | 10/2004 | Ferman | G06F 3/0481 386/251 |
| 2005/0160465 A1 | 7/2005 | Walker | |
| 2005/0177538 A1* | 8/2005 | Shimizu et al. | 707/1 |
| 2005/0264527 A1 | 12/2005 | Lin | |
| 2006/0007452 A1 | 1/2006 | Gaspard et al. | |
| 2006/0184538 A1 | 8/2006 | Randall et al. | |
| 2006/0271836 A1 | 11/2006 | Morford et al. | |
| 2006/0278722 A1 | 12/2006 | Tominaga | |
| 2007/0061724 A1 | 3/2007 | Slothouber et al. | |
| 2007/0143737 A1 | 6/2007 | Huang et al. | |
| 2008/0002021 A1 | 1/2008 | Guo et al. | |
| 2008/0005222 A1 | 1/2008 | Lambert et al. | |
| 2008/0066135 A1 | 3/2008 | Brodersen et al. | |
| 2008/0148317 A1* | 6/2008 | Opaluch | 725/46 |
| 2008/0172293 A1 | 7/2008 | Raskin et al. | |
| 2008/0196072 A1 | 8/2008 | Chun | |
| 2008/0209465 A1 | 8/2008 | Thomas et al. | |
| 2008/0235749 A1 | 9/2008 | Jain et al. | |
| 2008/0271068 A1* | 10/2008 | Ou et al. | 725/32 |
| 2009/0018898 A1 | 1/2009 | Genen | |
| 2009/0019009 A1 | 1/2009 | Byers | |
| 2009/0081950 A1 | 3/2009 | Matsubara et al. | |
| 2009/0089186 A1 | 4/2009 | Paolini | |
| 2009/0090786 A1 | 4/2009 | Hovis | |
| 2009/0094113 A1 | 4/2009 | Berry et al. | |
| 2009/0138906 A1 | 5/2009 | Eide et al. | |
| 2009/0199098 A1* | 8/2009 | Kweon | G11B 27/10 715/716 |
| 2010/0057782 A1 | 3/2010 | McGowan et al. | |
| 2010/0092079 A1 | 4/2010 | Aller | |
| 2010/0103106 A1 | 4/2010 | Chui | |
| 2010/0153831 A1 | 6/2010 | Beaton | |
| 2010/0154007 A1 | 6/2010 | Touboul et al. | |
| 2010/0199219 A1 | 8/2010 | Poniatowski et al. | |
| 2010/0222102 A1 | 9/2010 | Rodriguez | |
| 2010/0251292 A1 | 9/2010 | Srinivasan et al. | |
| 2010/0287592 A1 | 11/2010 | Patten et al. | |
| 2010/0312596 A1 | 12/2010 | Saffari et al. | |
| 2011/0023073 A1 | 1/2011 | McCarthy et al. | |
| 2011/0047299 A1 | 2/2011 | Yu et al. | |
| 2011/0049250 A1 | 3/2011 | Hovis et al. | |
| 2011/0067061 A1 | 3/2011 | Karaoguz et al. | |
| 2011/0162007 A1 | 6/2011 | Karaoguz et al. | |
| 2011/0167456 A1 | 7/2011 | Kokenos et al. | |
| 2011/0173659 A1* | 7/2011 | Lafreniere | H04N 5/44543 725/40 |
| 2011/0181780 A1 | 7/2011 | Barton | |
| 2011/0246295 A1 | 10/2011 | Kejariwal et al. | |
| 2011/0246495 A1 | 10/2011 | Mallinson | |
| 2011/0282906 A1 | 11/2011 | Wong | |
| 2011/0289534 A1* | 11/2011 | Jordan et al. | 725/48 |
| 2011/0296465 A1 | 12/2011 | Krishnan et al. | |
| 2012/0014663 A1 | 1/2012 | Knight et al. | |
| 2012/0072953 A1 | 3/2012 | James et al. | |
| 2012/0096499 A1 | 4/2012 | Dasher et al. | |
| 2012/0151530 A1 | 6/2012 | Krieger et al. | |
| 2012/0220223 A1 | 8/2012 | Rose et al. | |
| 2012/0238363 A1 | 9/2012 | Watanabe et al. | |
| 2012/0240161 A1 | 9/2012 | Kuo | |
| 2012/0256000 A1 | 10/2012 | Cok | |
| 2012/0256007 A1 | 10/2012 | Cok | |
| 2012/0308202 A1 | 12/2012 | Murata et al. | |
| 2013/0014155 A1 | 1/2013 | Clarke et al. | |
| 2013/0021535 A1 | 1/2013 | Kim et al. | |
| 2013/0024783 A1 | 1/2013 | Brakensiek et al. | |
| 2013/0057543 A1 | 3/2013 | Mann et al. | |
| 2013/0060660 A1 | 3/2013 | Maskatia et al. | |
| 2013/0094013 A1 | 4/2013 | Hovis et al. | |
| 2013/0110672 A1 | 5/2013 | Yang et al. | |
| 2013/0113993 A1 | 5/2013 | Dagit, III | |
| 2013/0144727 A1 | 6/2013 | Morot-Gaudry et al. | |
| 2013/0219434 A1 | 8/2013 | Farrell et al. | |
| 2013/0291018 A1 | 10/2013 | Billings et al. | |
| 2013/0339991 A1* | 12/2013 | Ricci | 725/14 |
| 2014/0035726 A1 | 2/2014 | Schoner et al. | |
| 2014/0035913 A1 | 2/2014 | Higgins et al. | |
| 2014/0043332 A1 | 2/2014 | Rollett | |
| 2014/0068670 A1 | 3/2014 | Timmermann et al. | |
| 2014/0122564 A1 | 5/2014 | Arora et al. | |
| 2014/0130102 A1 | 5/2014 | Iijima et al. | |
| 2014/0134947 A1 | 5/2014 | Stouder-Studenmund | |
| 2014/0208355 A1 | 7/2014 | Gregov et al. | |
| 2014/0281985 A1* | 9/2014 | Garrison | G06F 3/0482 715/716 |
| 2015/0095774 A1 | 4/2015 | Bates et al. | |
| 2015/0156562 A1 | 6/2015 | Treder et al. | |
| 2015/0195474 A1 | 7/2015 | Lu | |
| 2015/0339508 A1 | 11/2015 | Hosokane | |
| 2015/0357001 A1 | 12/2015 | Aliverti et al. | |

FOREIGN PATENT DOCUMENTS

| | | |
|---|---|---|
| WO | WO03084229 | 10/2003 |
| WO | 2014036413 | 3/2014 |

OTHER PUBLICATIONS

U.S. Appl. No. 13/601,267 entitled "Enhancing Video Content With Extrinsic Data" and filed Aug. 31, 2012.

U.S. Appl. No. 13/601,235 entitled "Timeline Interface for Video Content" and filed Aug. 31, 2012.

U.S. Appl. No. 13/601,210 entitled "Providing Extrinsic Data for Video Content" and filed Aug. 31, 2012.

"Sony Pictures to smarten up Blu-ray with MovieiQ, the 'killer app for BD-Live,'" Engadget, retrieved from http://www.engadget.com/2009/06/18/sony-pictures-to-smarten-up-blu-ray-with-movieiq-the-killer-ap/, Jun. 18, 2009.

"Hutu 'Face Match' feature attaches an actor's entire history to their mug," Engadget, retrieved from http://www.engadget. com/2011/12/08/hulu-face-match-feature-attaches-an-actors-entire-history-to/, Dec. 8, 2011.

"TVPius for the iPad," iTunes Store, retrieved from "http://itunes.apple.com/us/app/tvplus/id444774882?mt=B," updated Apr. 13, 2012.

U.S. Appl. No. 13/709,768, filed Dec. 10, 2012 entitled "Providing Content Via Multiple Display Devices".

"Wii U GamePad," Wii U Official Site—Features, retrieved from "http:f/www.nintendo.com/wiiu/features/," retrieved Dec. 4, 2012.

"Entertainment is more amazing with Xbox SmartGiass," Xbox SmartGiass 1 Companion Application—Xbox.com, retrieved from "http://www.xbox.com/en-US/smartglass," retrieved Dec. 4, 2012.

U.S. Appl. No. 13/709,768 entitled "Providing Content Via Multiple Display Devices" and filed Dec. 10, 2012.

U.S. Appl. No. 13/778,846 entitled "Shopping Experience Using Multiple Computing Devices" and filed Feb. 27, 2013.

U.S. Appl. No. 13/927,970 entitled "Providing Soundtrack Information During Playback of Video Content" and filed Jun. 26, 2013.

U.S. Appl. No. 14/034,055 entitled "Playback of Content Using Multiple Devices" and filed Sep. 23, 2013.

U.S. Appl. No. 14/826,508 entitled "Timeline Interface for Video Content" and filed Aug. 14, 2015.

Canadian Patent Application CA2,882,899, Office Action dated Apr. 6, 2016.

(56) References Cited

OTHER PUBLICATIONS

European Patent Application EP13832505.5, Extended European Search Report dated Mar. 15, 2016.
International Searching Authority and Written Opinion dated Mar. 21, 2014 for PCT/US2013/057543 filed Aug. 30, 2013.
ISO/IEC 18004:2006. Information technology—Automatic identification and data capture techniques—QR Code 2005 bar code symbology specification. International Organization for Standardization, Geneva, Switzerland.
U.S. Appl. No. 13/778,846, filed Feb. 27, 2013, Response to Final Office Action dated Jul. 29, 2016.
U.S. Appl. No. 13/778,846, filed Feb. 27, 2013, Final Office Action dated Jul. 29, 2016.
U.S. Appl. No. 13/778,846, filed Feb. 27, 2013, Response to Non-Final Office Action dated Jan. 20, 2016.
U.S. Appl. No. 13/778,846, filed Feb. 27, 2013, Non-Final Office Action dated Jan. 20, 2016.
U.S. Appl. No. 13/927,970, filed Jun. 26, 2013, Response to Restriction/Election dated Oct. 5, 2016.
U.S. Appl. No. 13/927,970, filed Jun. 26, 2013, Restriction/Election dated Oct. 5, 2016.
U.S. Appl. No. 14/034,055, filed Sep. 23, 2013, Response to Final Office Action dated Jul. 29, 2016.
U.S. Appl. No. 14/034,055, filed Sep. 23, 2013, Final Office Action dated Jul. 29, 2016.
U.S. Appl. No. 14/034,055, filed Sep. 23, 2013, Response to Non-Final Office Action dated Apr. 7, 2016.
U.S. Appl. No. 14/034,055, filed Sep. 23, 2013, Non-Final Office Action dated Apr. 7, 2016.
U.S. Appl. No. 14/034,055, filed Sep. 23, 2013, Response to Final Office Action dated Jan. 6, 2016.
U.S. Appl. No. 14/034,055, filed Sep. 23, 2013, Final Office Action dated Jan. 6, 2016.
U.S. Appl. No. 14/034,055, filed Sep. 23, 2013, Response to Non-Final Office Action dated Aug. 3, 2015.
U.S. Appl. No. 14/034,055, filed Sep. 23, 2013, Non-Final Office Action dated Aug. 3, 2015.
U.S. Appl. No. 14/493,970, filed Sep. 23, 2014, Response to Non-Final Office Action dated Jul. 29, 2016.
U.S. Appl. No. 14/493,970, filed Sep. 23, 2014, Non-Final Office Action dated Jul. 29, 2016.
U.S. Appl. No. 14/615,950, filed Feb. 6, 2015, Final Office Action dated Dec. 1, 2016.
U.S. Appl. No. 14/615,950, filed Feb. 6, 2015, Response to Non-Final Office Action dated May 26, 2016.
U.S. Appl. No. 14/615,950, filed Feb. 6, 2015, Non-Final Office Action dated May 26, 2016.
U.S. Appl. No. 14/615,950, filed Feb. 6, 2015, Response to Election/Restriction dated Feb. 10, 2016.
U.S. Appl. No. 14/615,950, filed Feb. 6, 2015, Restriction/Election dated Feb. 10, 2016.
U.S. Appl. No. 13/601,210, filed Aug. 31, 2012, Notice of Allowance dated Sep. 23, 2014.
U.S. Appl. No. 13/601,210, filed Aug. 31, 2012, Response to Final Office Action dated Jan. 2, 2014.
U.S. Appl. No. 13/601,210, filed Aug. 31, 2012, Final Office Action dated Jan. 2, 2014.
U.S. Appl. No. 13/601,210, filed Aug. 31, 2012, Response to Non-Final Office Action dated Aug. 1, 2013.
U.S. Appl. No. 13/601,210, filed Aug. 31, 2012, Non-Final Office Action dated Aug. 1, 2013.
U.S. Appl. No. 13/601,235, filed Aug. 31, 2012, Notice of Allowance dated Mar. 27, 2015.
U.S. Appl. No. 13/601,235, filed Aug. 31, 2012, Response to Non-Final Office Action dated Sep. 11, 2014.
U.S. Appl. No. 13/601,235, filed Aug. 31, 2012, Non-Final Office Action dated Sep. 11, 2014.
U.S. Appl. No. 13/601,267, filed Aug. 31, 2012, Notice of Allowance dated Jan. 21, 2014.
U.S. Appl. No. 13/601,267, filed Aug. 31, 2012, Response to Non-Final Office Action dated Aug. 14, 2013.
U.S. Appl. No. 13/601,267, filed Aug. 31, 2012, Non-Final Office Action dated Aug. 14, 2013.
U.S. Appl. No. 13/709,768, filed Dec. 10, 2012, Notice of Allowance dated Mar. 17, 2016.
U.S. Appl. No. 13/709,768, filed Dec. 10, 2012, Response to Final Office Action dated Oct. 23, 2015.
U.S. Appl. No. 13/709,768, filed Dec. 10, 2012, Final Office Action dated Oct. 23, 2015.
U.S. Appl. No. 13/709,768, filed Dec. 10, 2012, Response to Non-Final Office Action dated Apr. 21, 2015.
U.S. Appl. No. 13/709,768, filed Dec. 10, 2012, Non-Final Office Action dated Apr. 21, 2015.
U.S. Appl. No. 13/709,768, filed Dec. 10, 2012, Response to Non-Final Office Action dated Oct. 3, 2014.
U.S. Appl. No. 13/709,768, filed Dec. 10, 2012, Non-Final Office Action dated Oct. 3, 2014.
U.S. Appl. No. 14/225,864, filed Mar. 26, 2014, Response to Final Office Action dated Jul. 13, 2015.
U.S. Appl. No. 14/225,864, filed Mar. 26, 2014, Final Office Action dated Jul. 13, 2015.
U.S. Appl. No. 14/225,864, filed Mar. 26, 2014, Response to Non-Final Office Action dated Mar. 3, 2015.
U.S. Appl. No. 14/225,864, filed Mar. 26, 2014, Non-Final Office Action dated Mar. 3, 2015.
U.S. Appl. No. 13/227,097, filed Sep. 7, 2011, Notice of Allowance dated Oct. 22, 2013.
U.S. Appl. No. 13/227,097, filed Sep. 7, 2011, Response to Non-Final Office Action dated Apr. 9, 2013.
U.S. Appl. No. 13/227,097, filed Sep. 7, 2011, Non-Final Office Action dated Apr. 9, 2013.
U.S. Appl. No. 14/826,508, filed Aug. 14, 2015, Response to Non-Final Office Action dated Oct. 26, 2016.
U.S. Appl. No. 14/826,508, filed Aug. 14, 2015, Non-Final Office Action dated Oct. 26, 2016.
U.S. Appl. No. 15/154,233, filed May 13, 2016, Restriction/Election dated Feb. 3, 2017.
Canadian Patent Application CA2,882,899, Office Action dated Mar. 30, 2017.
U.S. Appl. No. 14/034,055, filed Sep. 23, 2013, Examiner's Answer dated May 24, 2017.
U.S. Appl. No. 13/927,970, filed Jun. 26, 2013, Response to Non-Final Office Action dated Apr. 3, 2017.
U.S. Appl. No. 13/927,970, filed Jun. 26, 2013, Non-Final Office Action dated Apr. 3, 2017.
U.S. Appl. No. 14/493,970, filed Sep. 23, 2014, Non-Final Office Action dated Jun. 6, 2017.
U.S. Appl. No. 14/493,970, filed Sep. 23, 2014, Response to Final Office Action dated Feb. 10, 2017.
U.S. Appl. No. 14/493,970, filed Sep. 23, 2014, Final Office Action dated Feb. 10, 2017.
U.S. Appl. No. 15/154,233, filed May 13, 2016, Non-Final Office Action dated Jun. 2, 2017.
U.S. Appl. No. 15/154,233, filed May 13, 2016, Response to Restriction/Election dated Feb. 3, 2017.
U.S. Appl. No. 14/826,508, filed Aug. 14, 2015, Notice of Allowance dated Apr. 27, 2017.
U.S. Appl. No. 14/615,950, filed Feb. 6, 2015, Non-Final Office Action dated May 5, 2017.
U.S. Appl. No. 14/615,950, filed Feb. 6, 2015, Response to Final Office Action dated Dec. 1, 2016.
U.S. Appl. No. 13/778,846, filed Feb. 27, 2013, Non-Final Office Action dated Jun. 5, 2017.

\* cited by examiner

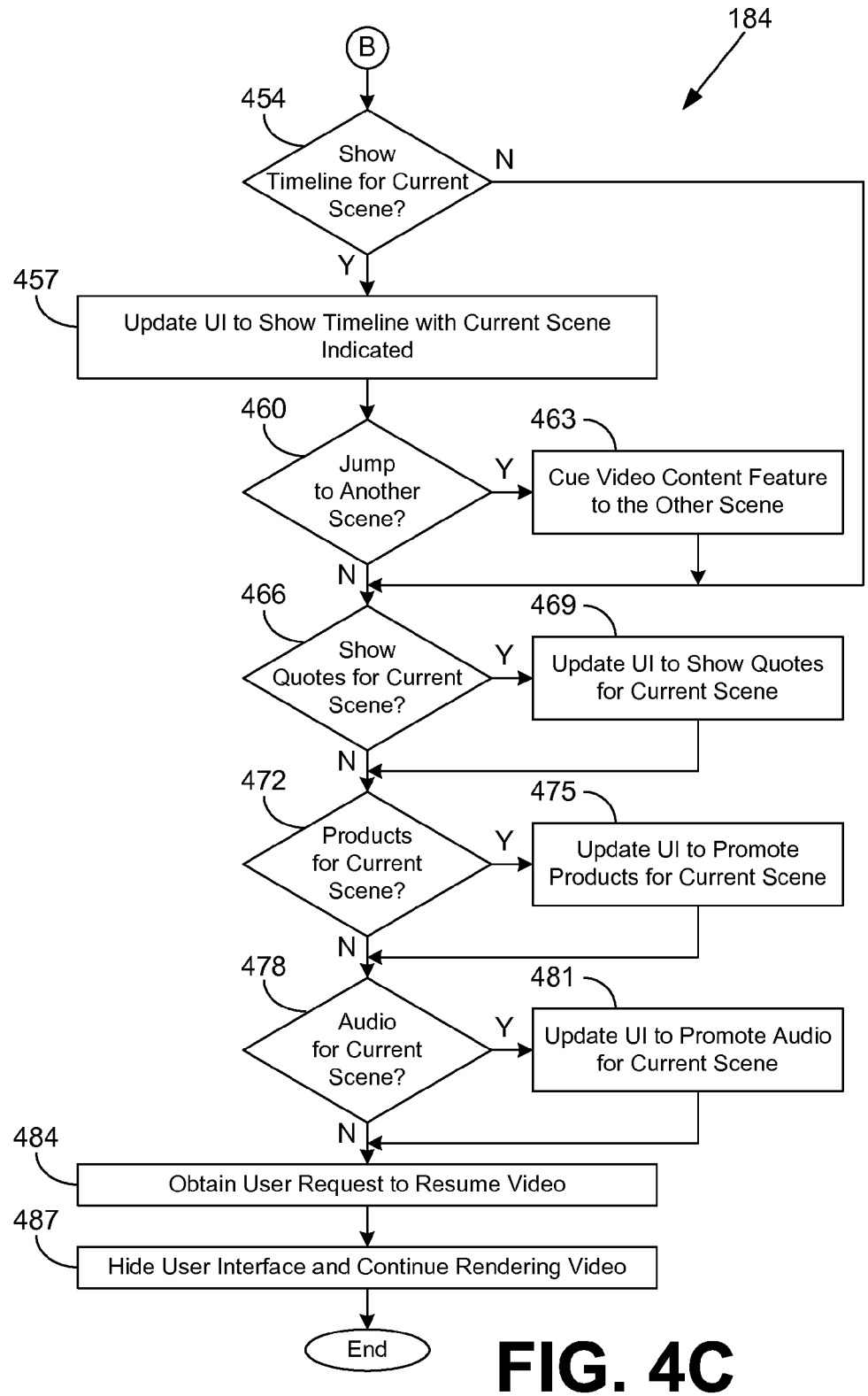

ENHANCING VIDEO CONTENT WITH PERSONALIZED EXTRINSIC DATA

BACKGROUND

People often want more information about the movies and other video content they are watching. To this end, people may search the Internet to find out more information about the video content. This information may include, for example, biographies of actors, production information, trivia, goofs, and so on.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 4A-4C show a flowchart illustrating one example of functionality implemented as portions of a content access application executed in a client in the networked environment of FIG. 1 according to various embodiments of the present disclosure.

DETAILED DESCRIPTION

The present disclosure relates to enhancing video content with extrinsic data such as, for example, cast and character images and information, biographical information, quotations, trivia, goofs, related offerings, scene information, and other extrinsic data. Specifically, the extrinsic data may be personalized for the viewer of the video content. Video content features may be offered for downloading or streaming from a server to a client via a network, and the extrinsic data may be sent to the client along with the video content feature. A user interface may be rendered to present relevant and personalized extrinsic data from the collection of extrinsic data that has been sent to the client.

As a non-limiting example, upon pausing of the video content feature, a user interface may be rendered in the client that shows headshots, names, and character names for all cast members who perform in the current scene of the video content feature. The user interface may present products relevant to the current scene for purchase or to be added to a list. The user interface may also present quotations, trivia, goofs, or other information related to the current scene. A user may select one of the cast members through the user interface, and the user interface may be updated with additional information about the selected cast member. For example, the user interface may be updated to provide biographical information for the cast member and to list related video content features, e.g., other video content features in which the selected cast member performs. The related video content features may be selected and/or ranked based at least in part on the watch history and/or other behavioral data associated with the user. The user may then choose to add one or more of the other video content features to a watch list.

Various techniques related to enhancing video content using extrinsic data are described in U.S. patent application Ser. No. 13/227,097 entitled "SYNCHRONIZING VIDEO CONTENT WITH EXTRINSIC DATA" and filed on Sep. 7, 2011, U.S. patent application Ser. No. 13/601,267 entitled "ENHANCING VIDEO CONTENT WITH EXTRINSIC DATA" and filed on Aug. 31, 2012, U.S. patent application Ser. No. 13/601,235 entitled "TIMELINE INTERFACE FOR VIDEO CONTENT" and filed on Aug. 31, 2012, U.S. patent application Ser. No. 13/601,210 entitled "PROVIDING EXTRINSIC DATA FOR VIDEO CONTENT" and filed on Aug. 31, 2012, U.S. patent application Ser. No. 13/927,970 entitled "PROVIDING SOUNDTRACK INFORMATION DURING PLAYBACK OF VIDEO CONTENT" and filed on Jun. 26, 2013, and U.S. patent application Ser. No. 14/034,055 entitled "PLAYBACK OF CONTENT USING MULTIPLE DEVICES" and filed on Sep. 23, 2013, all of which are incorporated herein by reference in their entirety. In the following discussion, a general description of the system and its components is provided, followed by a discussion of the operation of the same.

Figure 1:
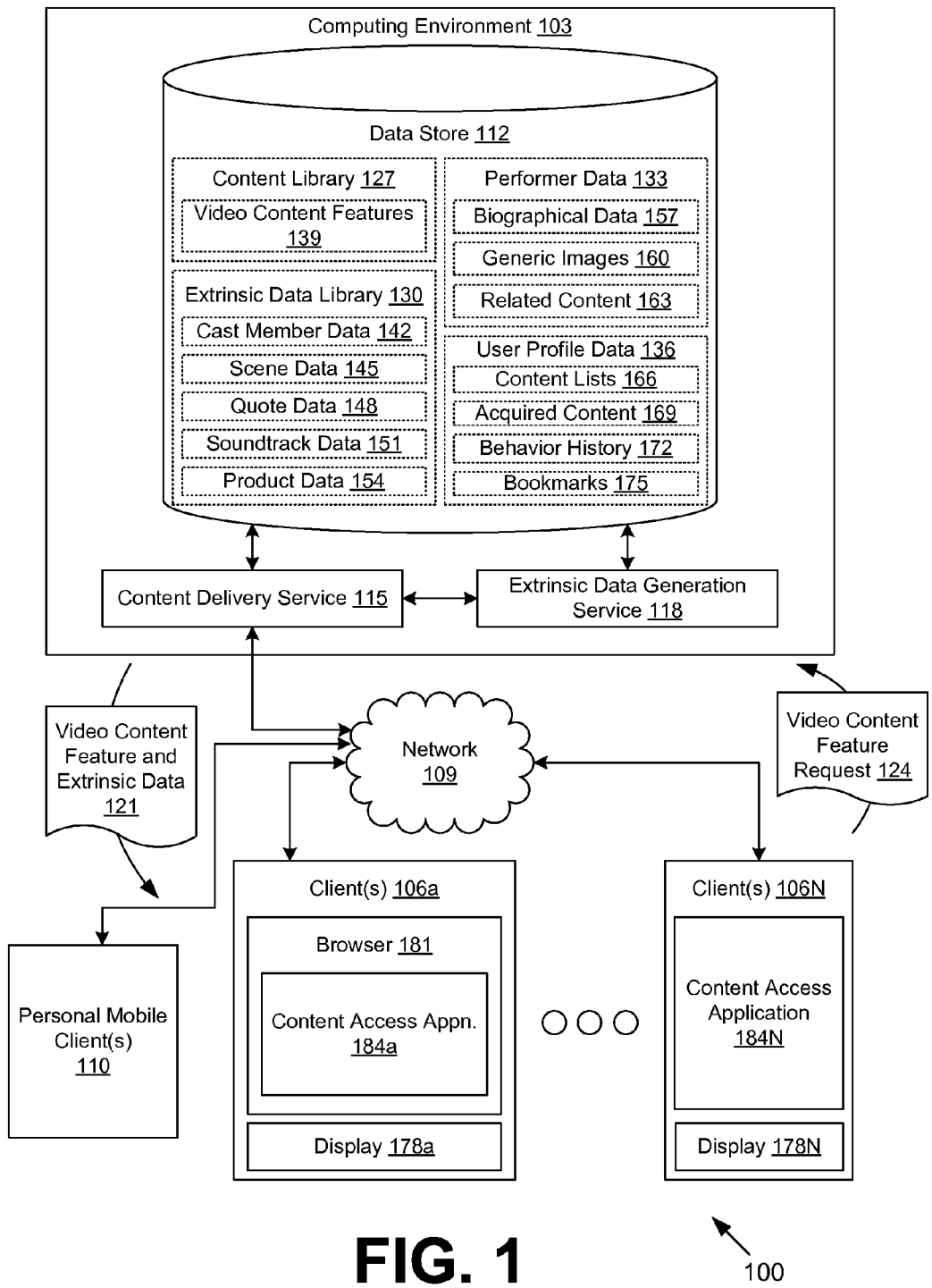
FIG. 1 is a drawing of a networked environment according to various embodiments of the present disclosure.

With reference to FIG. 1, shown is a networked environment 100 according to various embodiments. The networked environment 100 includes a computing environment 103 and a plurality of clients 106a . . . 106N in data communication via a network 109. The network 109 includes, for example, the Internet, intranets, extranets, wide area networks (WANs), local area networks (LANs), wired networks, wireless networks, cable networks, satellite networks, or other suitable networks, etc., or any combination of two or more such networks. In some scenarios, the networked environment 100 may include one or more personal mobile clients 110 in data communication with the network 109.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a content delivery service 115, an extrinsic data generation service 118, and other applications, services, processes, systems, engines, or functionality not discussed in detail herein. The content delivery service 115 is executed to serve up or stream video content to clients 106. The content delivery service 115 may support a resume functionality such that playback of video content may be stopped at a point in the video content on one device and later resumed at that point on the same device or a different device. The content delivery service 115 is configured to send extrinsic data to the clients 106 accompanying the video content. To this end, the content delivery service 115 sends the video content feature and extrinsic data 121 to the clients 106 in response to video content feature requests 124.

The extrinsic data generation service 118 is executed to generate extrinsic data to be sent along with video content to clients 106. For example, the extrinsic data generation service 118 may generate biographical information about performers from multiple sources, such as, for example, editorially curated sources and non-editorially curated sources. Also, the extrinsic data generation service 118 may select images to be used to represent cast members, which may be generic images or images of characters taken from the video content itself. The extrinsic data generation service 118 may also determine products and audio tracks which are associated with various scenes in the video content for promotional purposes.

The extrinsic data generation service 118 may generate a collection of extrinsic data to be sent to the client 106 along with initial portions of the video feature. In so doing, the extrinsic data generation service 118 may be configured to compress the collection of extrinsic data. The extrinsic data generation service 118 may also determine whether an offline mode is supported by the client 106. In response to such a determination, the extrinsic data generation service 118 may include resources if the offline mode is supported, or include uniform resource locators (URLs) to such resources if the offline mode is not supported.

It is noted that the extrinsic data for video content may change over time. To this end, the extrinsic data generation service 118 may dynamically generate the extrinsic data for a particular video content feature multiple times, using the latest updated data. The extrinsic data may be generated by the extrinsic data generation service 118 upon each request for a video content feature. The extrinsic data may be cached within a content delivery network if regeneration is not performed.

Also, the various extrinsic data may be personalized based at least in part on the users who are viewing the particular video content feature. This may include ranking and ordering data items, rendering data with varying degrees of prominence within a user interface, including or excluding certain data items, and/or other forms of personalization. In some embodiments, the extrinsic data may be personalized server-side by the extrinsic data generation service 118 such that the personalized extrinsic data is sent to the clients 106. In other embodiments, non-personalized extrinsic data is sent to the clients 106 for personalization by the clients 106.

The data stored in the data store 112 includes, for example, a content library 127, an extrinsic data library 130, performer data 133, user profile data 136, and potentially other data. The content library 127 may include multiple video content features 139 such as movies, television shows, video clips, and/or other forms of video content. Although described as "video content," it is understood that the video content features 139 may include accompanying audio, closed captioning text, and/or other data. It is noted that the content library 127 may be absent in some embodiments as the computing environment 103 may generate and send the extrinsic data and not actually present the content.

The extrinsic data library 130 includes various extrinsic data items that are associated with the video content features 139. Non-limiting examples of the extrinsic data items may include names or descriptions of performers in the video content features 139, biographies or filmographies of the performers, commentary, trivia, mistakes, user comments, images, and/or other data. The extrinsic data items may include curated data that is professionally managed, verified, or is otherwise trustworthy. The various extrinsic data items may be assigned rankings based at least on various criteria, such as, for example, overall popularity measured by cumulative number of selections, viewings, purchases, searches, and so on.

For example, the extrinsic data library 130 may include cast member data 142, scene data 145, quote data 148, soundtrack data 151, product data 154, and/or other data. The cast member data 142 include the name, character information, images, and/or other data describing cast members who perform in a video content feature 139. The term "cast member" may in some cases encompass additional participants in a video content feature 139, such as, for example, crew members. The images may correspond to generic images not taken from the video content feature 139 and/or character images captured from or defined as a portion of a frame of the video content feature 139.

The scene data 145 divides a video content feature 139 into multiple scenes. A scene corresponds to a period of time in the video content feature 139 having multiple frames, and may be determined as having a distinct plot element or setting. The scene data 145 may identify the cast members or characters who perform in a given scene. In some cases, the scene data 145 may record the times when the cast members or characters first appear in the scene, last appear in the scene, or are on-screen. In some embodiments, the times may be represented as a frame number, or a range of frame numbers, in the video content feature 139. The scene data 145 may also include positional or location information as to where cast members and/or products appear within a frame on screen. The quote data 148 may include various quotations from characters in the video content feature 139 and may be correlated with times of appearance in the video content features 139 and/or scenes of appearance in the video content features 139. In addition to quote data 148, the extrinsic data library 130 may include data relating to trivia, goofs, user-generated comments, and so on, which may be correlated to particular times or scenes within the video content feature 139.

The soundtrack data 151 may include various information about the audio of the video content feature 139. For example, the soundtrack data 151 may identify that a particular audio track is being used at a certain time in the video content feature 139 or during a certain scene of the video content feature 139. In addition, the soundtrack data 151 may identify performers who vocally perform characters in the audio. Such performers may be considered cast members. However, such performers may differ from cast members who visually perform the same characters in some cases. One such case is where a song is recorded by a vocalist and a different performer merely lip-syncs to the recorded song in the video of the video content feature 139.

The product data 154 may identify associations of products with times or scenes in video content features 139. The products may correspond to any item offered for purchase, download, rental, or other form of consumption. For example, a particular brand of potato chips may be shown and/or mentioned in dialogue of a movie. The product data 154 may be used to promote products that are related to various scenes in the video content features 139 at the appropriate times. Such promotions may be rendered relative to a position of the product within a frame of the video content feature 139. Such products may also include books, electronic books, soundtrack albums, etc. that are related to the video content feature 139. For example, the video content feature 139 may be an adaptation of a book, or the album might be for the soundtrack of the video content feature 139.

The performer data 133 may include information about performers in video content features 139. Such performers may be on-screen performers, vocalists, and/or other performers. In some cases, the performer data 133 may include other participants in the video content features 139 such as, for example, crew members and others. The performer data 133 may include biographical data 157, generic images 160, related content 163, and so on. The biographical data 157 may include various information such as stage name, birth name, date of birth, date of death, an editorially curated biography, and/or other information. Such data may be taken from editorially curated sources and/or non-editorially curated sources (e.g., "Wiki" sources).

The generic images 160 correspond to images of the performer which are taken when the performer is not performing a particular character. For example, such an image might be taken at an awards ceremony, at a press conference, at an informal setting, and/or elsewhere. Such an image may be a headshot or other image. Multiple generic images 160 may be provided for a particular performer. For example, a performer may have a lengthy career, and generic images 160 may be included for various times within the career. The related content 163 describes video content features 139 in which the performer appears, directs, produces, or is otherwise connected.

The user profile data 136 includes various data about users of the content delivery service 115. The user profile data 136 may include content lists 166, acquired content 169, behavior history 172, bookmarks 175, and/or other data. The user profile data 136 may also include or describe a collection of video content feature reviews authored by the user. The content lists 166 may correspond to watch lists, wish lists, shopping lists, "favorites" lists, and/or other user-managed lists of video content features 139. The acquired content 169 describes to which content in the content library 127 a user has access. For example, a user may have rented or purchased a particular video content feature 139. In some cases, a user may have a subscription that provides access to all or some of the video content features 139. Such a subscription may be limited in some way (e.g., number of titles, number of bytes, quality level, time of day, etc.) or unlimited.

The behavior history 172 may include various data describing behavior or preferences of a user. Such data may include a purchase history, a browsing history, a view history, selected titles history, explicitly configured viewing preferences, video content review history, and/or other data. The behavior history 172 may be generated by way of user interaction with the content delivery service 115 and/or may be acquired from external sources. For example, the behavior history 172 may include information about product purchases from one or more retailers, information about attendance at movie theaters, information about video rentals by mail or from brick-and-mortar rental outlets, information from subscription television services, and so on. The bookmarks 175 correspond to specific times or scenes in a video content feature 139 that the user has indicated to be interesting and worthy to return to in the future.

The clients 106 are representative of a plurality of client devices that may be coupled to the network 109. Each client 106 may comprise, for example, a processor-based system such as a computer system. Such a computer system may be embodied in the form of a smart television, a desktop computer, a laptop computer, personal digital assistants, cellular telephones, smartphones, set-top boxes, music players, web pads, tablet computer systems, game consoles, electronic book readers, or other devices with like capability. Each client 106 may include one or more displays 178a . . . 178N. Each display 178 may comprise, for example, one or more devices such as liquid crystal display (LCD) displays, gas plasma-based flat panel displays, organic light emitting diode (OLED) displays, LCD projectors, or other types of display devices, etc. In some embodiments, the displays 178 may correspond to touchscreen displays.

Each client 106 may be configured to execute various applications such as a browser 181, a respective one of a plurality of content access applications 184a . . . 184N, and/or other applications. The browser 181 may be executed in a client 106, for example, to access network content served up by the computing environment 103 and/or other servers, thereby rendering a user interface on the display 178. The content access application 184 is executed to obtain video content features 139 from the content delivery service 115 and to render the video content features 139 on the display 178. Additionally, the content access application 184 may be configured to obtain extrinsic data from the content access application 184 and to render a user interface based at least in part on the extrinsic data to enhance the user experience in viewing the video content feature 139.

In some cases, the video content feature 139 may be rendered on a different display 178 (of the same or different client 106) from the user interface. In one embodiment, the content access application 184 may be a plug-in of the browser 181 or otherwise executed in the environment of the browser 181. The clients 106 may be configured to execute other applications such as, for example, mobile applications, email applications, social networking applications, etc.

In addition to the clients 106, one or more personal mobile clients 110 may be present in the network 109. The personal mobile clients 110 may correspond to tablets, smartphones, electronic book readers, etc., that may be associated with particular users. Discovering the personal mobile clients 110 in proximity to the clients 106 may lead to an inference that the associated user is watching the content rendered by the clients 106. Accordingly, the extrinsic data presented in connection with the content may be personalized in view of the users who are present.

Next, a general description of the operation of the various components of the networked environment 100 is provided. To begin, a user may acquire rights to view video content features 139 in a content library 127. A client 106 associated with a user may request to stream or download a video content feature 139 from the content delivery service 115. The extrinsic data generation service 118 may generate a collection of extrinsic data that is relevant to the video content feature 139. The extrinsic data is sent along with the video content feature 139 to the client 106 over the network 109. In an alternative embodiment, the video content feature 139 and the extrinsic data are available to the client 106 on a computer-readable medium.

The content access application 184 of the client 106 renders the video content feature 139 on the display 178. The content access application 184 may also render various user interfaces on the display 178 using the extrinsic data to enhance the user experience. The user interfaces may allow users to quickly learn who is on screen while the video content feature 139 is playing, to understand how they know the particular performer, to discover other video content features 139 related to the performers on screen and to add them to a watch list, among other functionality. The user interfaces may be dynamically updated as the video content feature 139 progresses in the foreground or in the background. Non-limiting examples of such user interfaces are shown and will be described in connection with FIGS. 2A-2H.

One feature of the user interfaces may include cast member images. Such images may be generic images 160 of the performer or images of the performer in character. The extrinsic data generation service 118 may be configured to prefer generic images 160 if available (or vice versa). Further, the extrinsic data generation service 118 may be configured to select a generic image 160 that is most relevant to the particular video content feature 139 according to a measure of relevancy. For example, an actor may have a career spanning from the 1950s to the 1990s, and the generic images 160 may include images at different times in his career. If the video content feature 139 was produced in 1955, the extrinsic data generation service 118 may be configured to prefer a generic image 160 of the actor from the 1950s over a generic image 160 of the actor from the 1990s. Thus, the extrinsic data generation service 118 may be configured to compare a date associated with a generic image 160 and a date associated with a video content feature 139 in order to select the generic image 160.

Character images may be captured directly from the video content features 139. In some cases, an editor client may specify a portion of a frame within a video content feature 139 as corresponding to a particular character image. The image may be captured and transmitted to the client 106, or the client 106 may be configured to capture and decode the frame portion according to a definition in the extrinsic data available to the client.

Biographical information may also be included in user interfaces. Such information may be pulled automatically from multiple sources. The extrinsic data generation service 118, for example, may be configured to prefer editorially curated data sources. However, if a description is relatively short, the extrinsic data generation service 118 may be configured to employ non-editorially curated data sources for the description. In one embodiment, the extrinsic data generation service 118 may non-editorially curated data sources only for factual data such as names and dates. Generation of biographical data 157 from multiple data sources may occur instead or in part in the client 106 as configured by the extrinsic data and/or user preferences.

It is understood that multiple clients 106 and multiple displays 178 may be employed in some embodiments. For example, the video content feature 139 may be rendered on one display 178, while the user interface is rendered on another display 178. Where the displays 178 are attached to different clients 106, the clients 106 may communicate directly via the network 109 or indirectly with communication facilitated by the content delivery service 115. The communication is used to synchronize the rendering of the video content feature 139 with what is occurring in the separately rendered user interface. For example, if a user employs the user interface in one client 106 to jump to another scene of the video content feature 139, the communication informs the other client 106 to begin or cue playback at the other scene.

In some embodiments, the video content feature 139 may be rendered in a movie theater or on a display device which is not in communication with a client 106. In such embodiments, the client 106 may determine a current time or scene in the video content feature 139 through analysis of captured video and/or audio from the rendered video content feature 139. In some cases, the content access application 184 may be awakened to present the user interface in response to detecting applause, laughter, or other cues that indicate presence in a viewing area for a video content feature 139.

Figure 2A:
FIGS. 2A-2I are drawings of an examples of video content features and user interfaces rendered by a client in the networked environment of FIG. 1 according to various embodiments of the present disclosure.

Referring next to FIG. 2A, shown is one example of a video content feature 139 rendered on a display 178 (FIG. 1) of a client 106 (FIG. 1) in the networked environment 100 (FIG. 1) according to various embodiments. The video content feature 139 may be streamed over the network 109 (FIG. 1) or previously downloaded to the client 106.

Figure 2B:
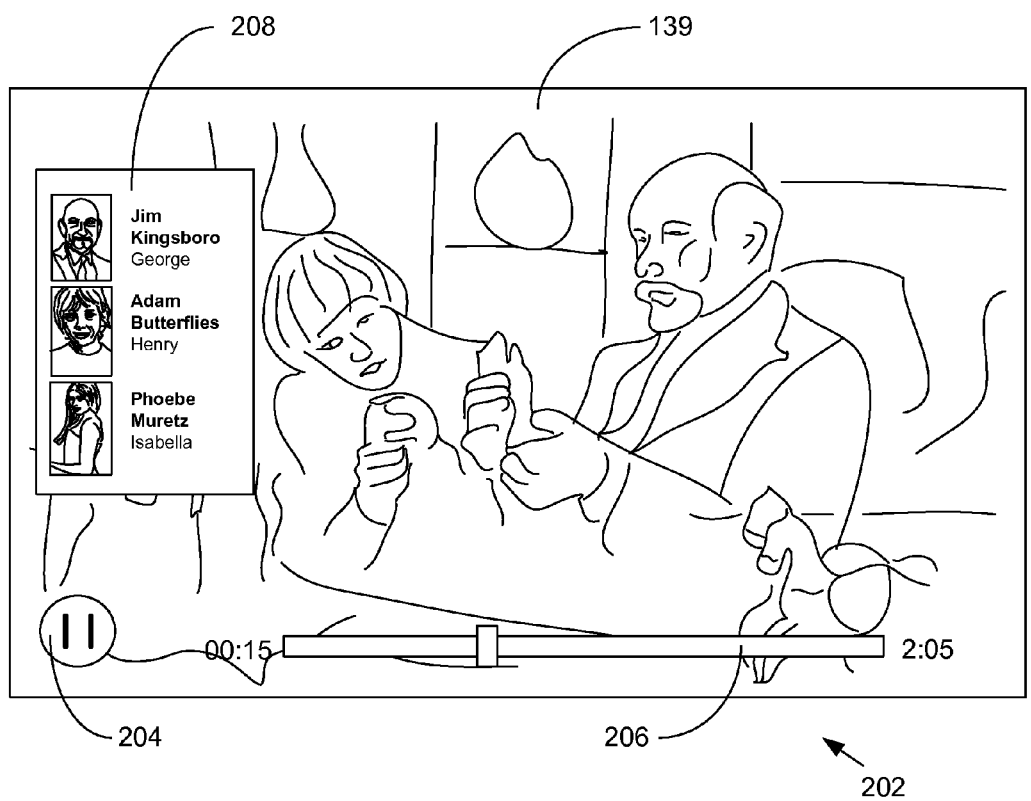

Moving on to FIG. 2B, shown is one example of a user interface 202 rendered on top of the video content feature 139 on the display 178 (FIG. 1) of a client 106 (FIG. 1) in the networked environment 100 (FIG. 1) according to various embodiments. The user interface 202 partially obscures the video content feature 139 in this example. In some cases, the visible portion of the video content feature 139 may be darkened or dimmed. In other examples, the user interface 202 may fully cover the video content feature 139. In other examples, the user interface 202 may be rendered adjacent to the video content feature 139. In still other examples, the user interface 202 may be rendered on a different display 178 and potentially by a different client 106 (FIG. 1).

How the user interface 203 is rendered may depend based at least in part on user profile data 136 associated with current users. For example, the interface components may be sized and/or located based at least in part on configured preferences of the user, past user behavior in interacting (or not interacting) with the interface components, and so on. If the user is left handed, the components may be oriented to facilitate left-handed use, and likewise if the user is right handed or ambidextrous.

The user interface 202 may be invoked by the user providing a pause command or other command, moving a mouse, tapping on or making a gesture relative to a touchscreen, selecting a button on a remote control, or another approach. In one embodiment, the user interface 202 may appear for a short time when the video content feature 139 is started and then may disappear. When the user interface 202 is shown, the video content feature 139 may continue playback in the background or may be paused. In this non-limiting example, the video content feature 139 continues playback and a pause control 204 is rendered. A playback slider control 206 may be provided to indicate the current position in the video content feature 139 and to facilitate seeking or cueing by the user to another position in the video content feature 139. Volume controls, fast forward controls, reverse controls, and/or other controls may be provided in other examples.

The user interface 202 may include a cast member selection component 208. In one example, the cast member selection component 208 may be configured to indicate all of the cast members who perform in the video content feature 139. In another example, the cast member selection component 208 may be configured to indicate all of the cast members who perform in the current scene of the video content feature 139 regardless of whether the cast members are currently pictured. In another example, the cast member selection component 208 may be configured to indicate all of the cast members who have appeared up to a current time in the current scene. In such a case, the cast member selection component 208 may be dynamically updated with new cast members who have thus appeared in the current scene while the video content feature 139 plays. In still another example, the cast member selection component 208 may be configured to indicate all of the cast members who are currently pictured.

The cast member selection component 208 may include cast member indicia such as an image, a name, and a character name for each cast member in the particular set or subset of cast members. If the cast member selection component 208 is not large enough to indicate all of the set or subset of cast members at once, the cast member selection component 208 may have a scrollable viewport. The ordering/sequencing of the cast member indicia may depend on user profile data 136 and/or determining which cast member indicia to show may depend on user profile data 136. For example, the cast member indicia may be in a ranked order based upon a user's indicated level of interest in the particular corresponding cast member. The user interface 202 may be hidden in response to user inaction, the user tapping on the touchscreen, the user selecting a hide or close button, etc.

Figure 2C:
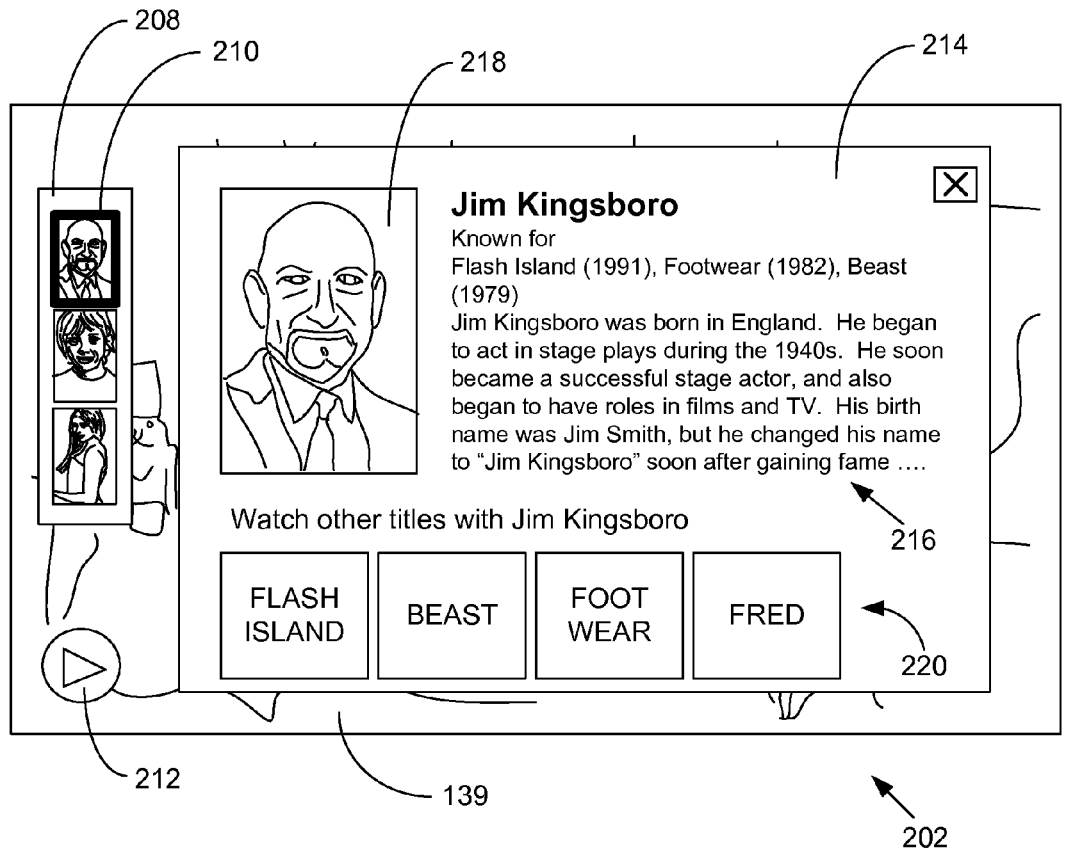

Continuing now to FIG. 2C, shown is another example of a user interface 202 rendered on top of the video content feature 139 on the display 178 (FIG. 1) of a client 106 (FIG. 1) in the networked environment 100 (FIG. 1) according to various embodiments. In this non-limited example, the user has selected the cast member component 210 in the cast member selection component 208. Further, in comparison to FIG. 2B, the cast member selection component 208 in FIG. 2C omits cast member name and character name from the cast member indicia to provide a more concise presentation. In other examples, the image may be omitted and a cast member name/character name (or any combination thereof) may be present. The pause control 204 (FIG. 2B) has been replaced with a play control 212, indicating that the video content feature 139 has been paused and play may be resumed.

In response to the user selecting the cast member component 210, a detail interface 214 has been rendered. The detail interface 214 provides additional information regarding the selected cast member, who here is "Jim Kingsboro." Specifically, the detail interface 214 may provide biographical information 216, a larger image 218, additional images, and so on.

Which categories of information are provided for the cast member as well as the prominence of their presentation may be controlled based at least in part on the user profile data 136. In one example, a user may have configured a preference for showing cast members' real names, and consequently, the real names may be featured relatively prominently (e.g., relatively larger text, bold text, emphasized text, etc.) within the detail interface 214. In another example, birth dates for cast members may be inferred from the users' past behavior to be particularly important and may be emphasized. By contrast, the birth dates for cast members may be relatively unimportant for other users and may be excluded or hidden outside the viewport where screen space is at a premium.

Additional information may be made visible by scrolling a viewport. In addition, the detail interface 218 may provide related video content feature selection components 220. Such related video content feature selection components 220 may correspond to promotional images of video content features 139, text labels for video content features 139, and so on, where the video content features 139 are somehow related to the selected cast member. For example, the selected cast member may perform, direct, produce, etc. the related video content features 139.

The related video content feature selection components 220, e.g., corresponding to a cast member's filmography, may be included or excluded based at least in part on user profile data 136 (FIG. 1) such as the behavior history 172 (FIG. 1), acquired content 169 (FIG. 1), content lists 166 (FIG. 1), and/or other profile data associated with the user. For example, certain of the video content features 139 which are more likely to be of interest to the user may be presented first or otherwise with a greater prominence. Additional related video content feature selection components 220 may be made visible through scrolling a viewport. When a user selects one of the related video content feature selection components 220, the user may be presented with further detailed information about the selected video content feature 139. Alternatively, or additionally, the user may add the selected video content feature 139 to a watch list or other list in the content lists 166 and/or acquire rights to view the selected video content feature 139.

Figure 2D:
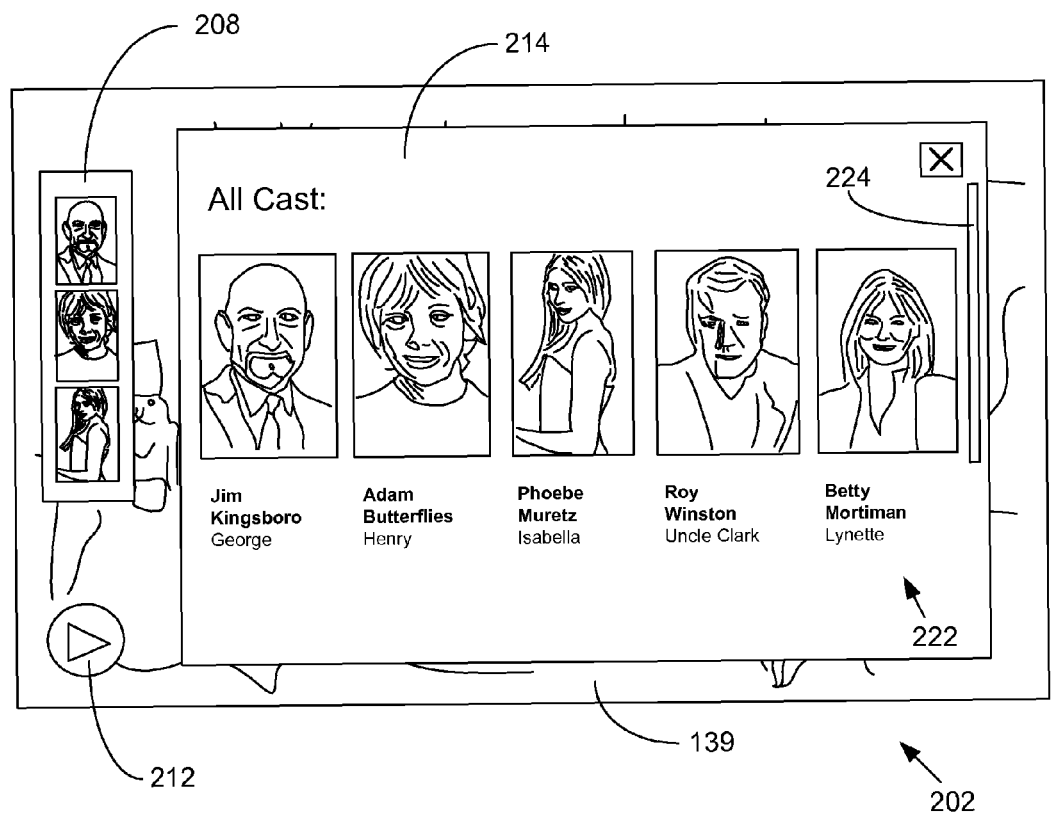

Referring next to FIG. 2D, shown is another example of a user interface 202 rendered on top of the video content feature 139 on the display 178 (FIG. 1) of a client 106 (FIG. 1) in the networked environment 100 (FIG. 1) according to various embodiments. In this non-limiting example, the detail interface 214 has been updated to show selectable cast member components 222 for all of the cast members in the video content feature 139. In this non-limiting example, an image, name, and character name is shown for each of the cast members. The types of content within the selectable cast member components 222 may be personalized for the user. Selecting a selectable cast member component 222 may cause the detail interface 214 to be updated with additional information about the corresponding selected cast member as in FIG. 2C. A scroll bar 224 or other indication may inform the user that the viewport may be scrolled to make visible additional selectable cast member components 222 for other cast members.

Figure 2E:
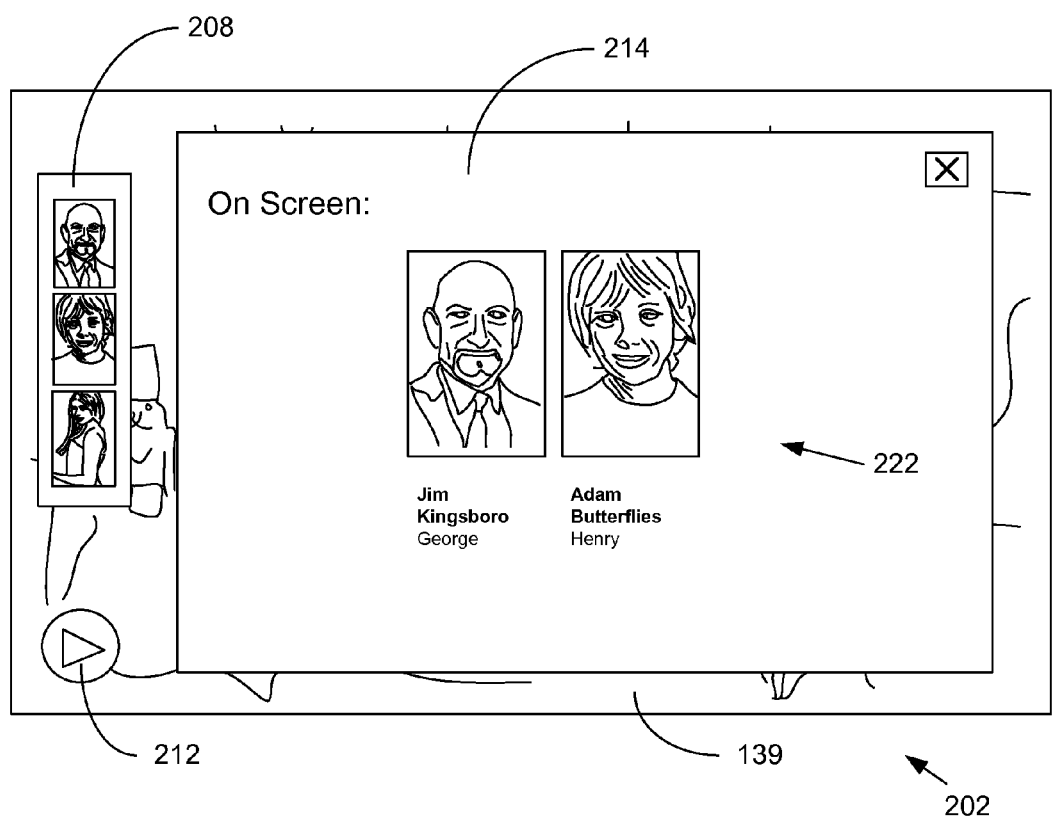

Moving to FIG. 2E, shown is another example of a user interface 202 rendered on top of the video content feature 139 on the display 178 (FIG. 1) of a client 106 (FIG. 1) in the networked environment 100 (FIG. 1) according to various embodiments. In this non-limiting example, the detail interface 214 of FIG. 2D has been updated to show selectable cast member components 222 for all of the cast members in the video content feature 139 who are currently performing in the video content feature 139 or performing in a current scene of the video content feature 139. These cast members may correspond to a subset of the cast members shown in the detail interface 214 of FIG. 2D. The information shown or excluded in this detail interface 214 may be personalized based at least in part on the user profile data 136 (FIG. 1).

Figure 2F:
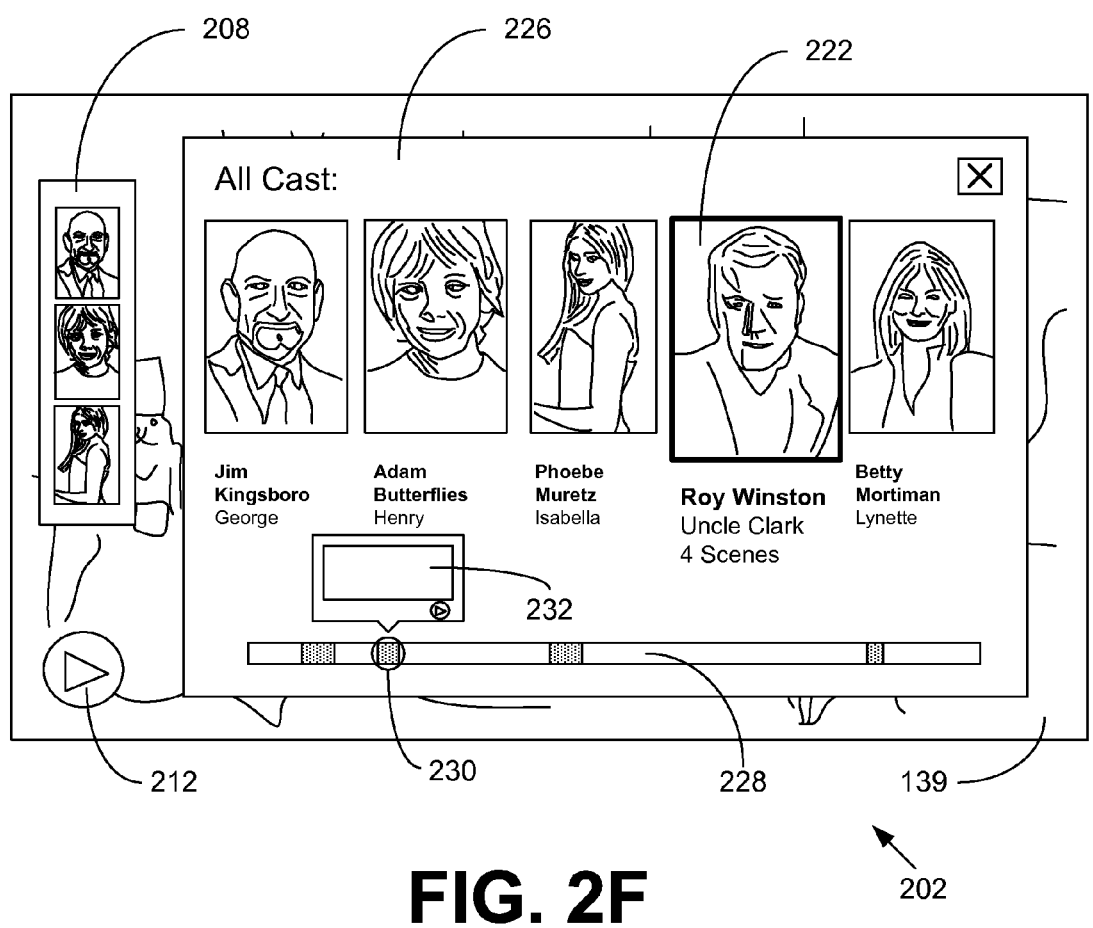

With reference to FIG. 2F, shown is another example of a user interface 202 rendered on top of the video content feature 139 on the display 178 (FIG. 1) of a client 106 (FIG. 1) in the networked environment 100 (FIG. 1) according to various embodiments. In this non-limiting example, a timeline interface 226 is presented in the user interface 202. The timeline interface 226 features selectable cast member components 222 for all or a subset of the cast members for the video content feature 139.

The information shown or excluded in the timeline interface 226 may be personalized based at least in part on the user profile data 136 (FIG. 1). For example, the selectable cast member components 222 may be in a ranked order based at least in part on a level of interest expressed by the user in the particular corresponding cast members according to previous content viewings, purchases, and/or other user profile data 136. In some cases, different weights may be assigned to the level of interest based at least upon the expression of the interest. For example, a purchase of a video content feature 139 may express a greater level of interest as compared to a mere rental. However, in some cases, video content features 139 may be purchased yet never viewed, indicating a relatively lower level of interest. More recent activity in the user profile data 136 may be given a greater weight as to level of interest as compared to older activity.

One of the selectable cast member components 222 corresponding to "Roy Winston" is currently selected. The selectable cast member component 222 which is selected indicates the quantity of scenes in the video content feature 139 in which the particular cast member appears. In this case, "Roy Winston" appears as the character "Uncle Clark" in four scenes. Where the cast member performs as multiple characters, the quantity information may be provided per character. Alternatively, separate selectable cast member components 222 may be provided for each character.

A timeline component 228 visually represents the video content feature 139 and visually segments the video content feature 139 into multiple scenes. The size, placing, and/or other characteristics of the timeline component 228 may be personalized based at least in part on the user profile data 136. In this example, the four scenes in which the selected cast member appears are highlighted. Where a subset of the scenes is presented in the timeline component 228, functionality may be provided to play the subset of the scenes sequentially. It is noted that such scenes may be non-contiguous. To this end, the user interface 202 may include a sequential play component, the selection of which launches the sequential play of the subset of the scenes. The division of the remainder of the timeline component 228 into scenes is absent in FIG. 2F but may be present in other examples.

A cursor 230 indicates that one of the scenes is selected for previewing. A preview component 232 may allow the user to see a title for the scene and/or an image for the scene. Further, the preview component 232 may include controls to allow the user to cause playback of the video content feature 139 to begin or be cued to the particular scene. In one embodiment, the scene may be previewed as picture-in-picture video within the preview component 232. Additional information such as start time, end time, length, and so on may be provided in some embodiments.

Figure 2G:
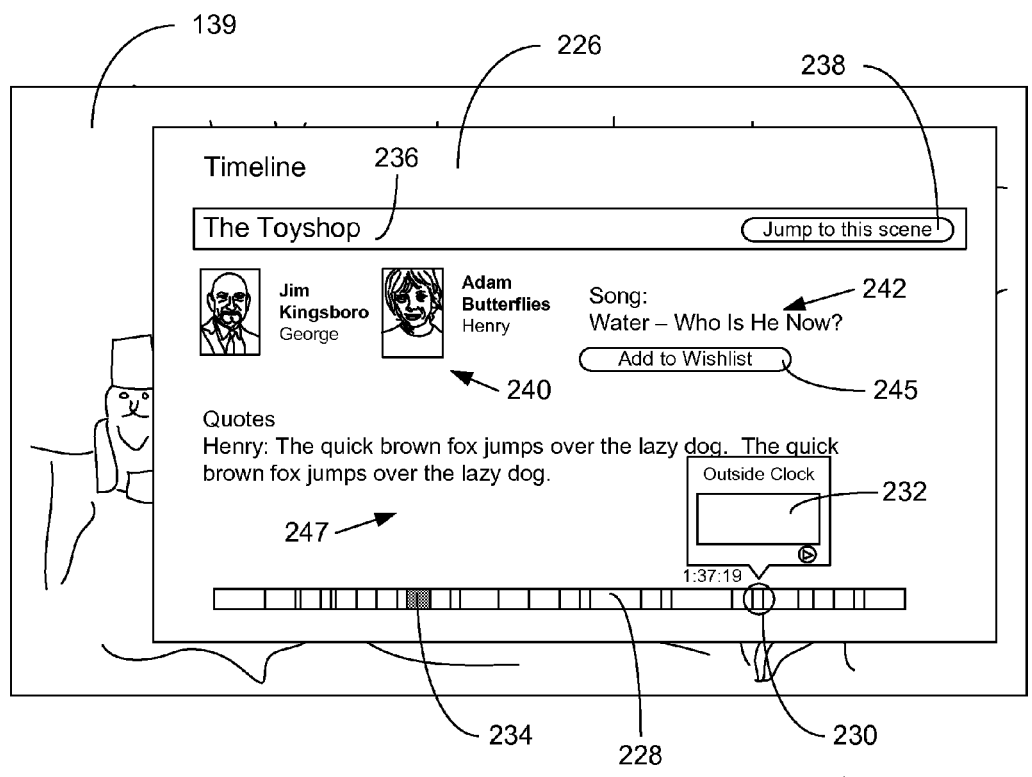

Turning now to FIG. 2G, shown is another example of a user interface 202 rendered on top of the video content feature 139 on the display 178 (FIG. 1) of a client 106 (FIG. 1) in the networked environment 100 (FIG. 1) according to various embodiments. Like FIG. 2F, a timeline interface 226 is presented in the user interface 202. The timeline interface 226 of FIG. 2G provides additional information regarding a current scene 234 or other scene rather than additional information regarding a specific cast member. The information shown or excluded in this timeline interface 226 may be personalized based at least in part on the user profile data 136 (FIG. 1).

The timeline component 228 shows a division or segmentation of the video content feature 139 into scenes. In some examples, only a portion of the timeline component 228 is shown and the timeline component 228 may be "zoomed in" or scrolled so that another portion may be shown. It is noted that the scenes are not of equal length in this non-limiting example. The current scene 234 is indicated on the timeline component 228 by way of highlighting.

The timeline interface 226 includes a header 236 identifying a name of the current scene 234. If the current scene 234 in the timeline interface 226 does not correspond to the current scene 234 being played out, a jump component 238 may be presented. The jump component 238, when selected, may cause the video content feature 139 to begin playback or be cued for playback at the current scene 234. Also, the jump component 238 may cause the user interface 202 to be hidden or dismissed in some embodiments. Cast member indication components 240 identify the cast members who perform in the current scene 234. Where other cast members perform by providing vocals for the current scene 234, the other cast members may be identified similarly.

A current audio track 242 which is featured in the scene may be identified according to the soundtrack data 151 (FIG. 1). An add to list component 245 may be provided in order to add the current audio track 242 to a wish list, shopping list, shopping cart, or other list. The add to list component 245 may also or instead facilitate an immediate acquisition of the current audio track 242. Where related products have been identified for the current scene 234, promotions for the related products may be provided. Such promotions may include add to list components, acquisition components, creative components, and so on. The promotions may be included, excluded, given a relative prominence, etc., based at least in part on user purchase history, behavior history 172 (FIG. 1), and/or other user profile data 136. Quotations 247, trivia, goofs, and/or other information pertinent to the current scene 234 may also be featured in the timeline interface 226. The types of information included or excluded may depend on the user's preferences, past behavior, and so on, as recorded in the user profile data 136. In some cases, components in the user interface 202 may be rendered for the user to provide comments regarding the current scene. Such comments may be sent back to the content delivery service 115 (FIG. 1) or otherwise associated with the current scene of the video content feature 139.

Figure 2H:
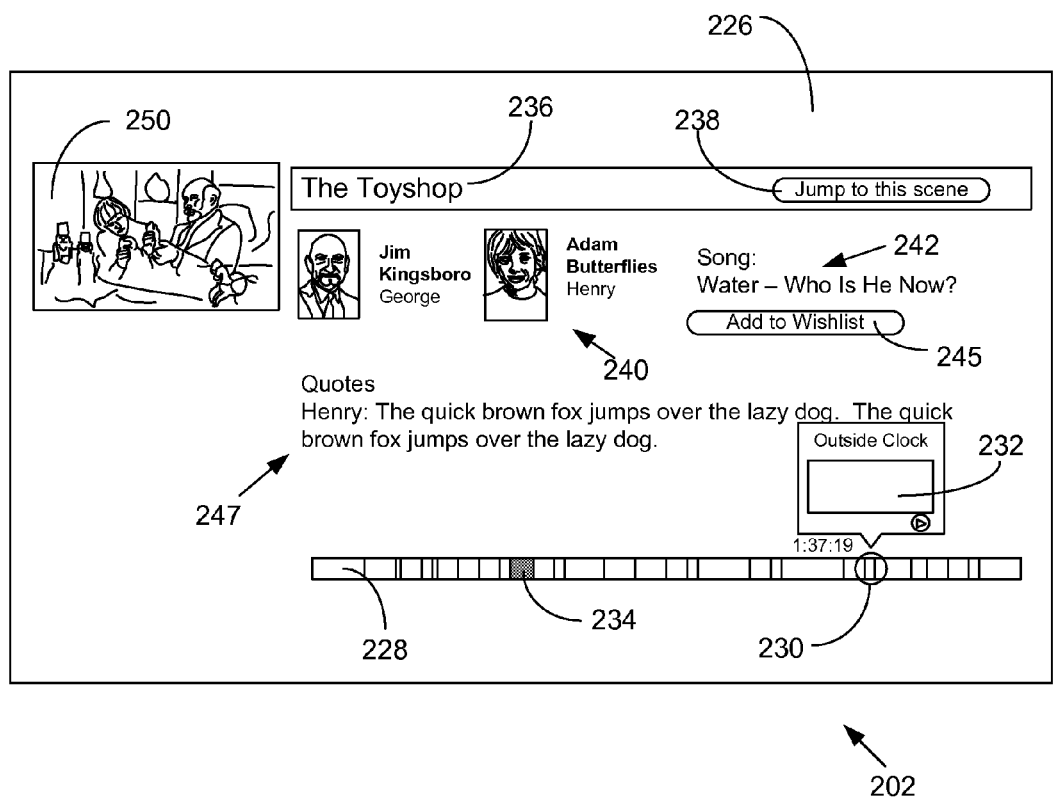

Continuing now to FIG. 2H, shown is another example of a user interface 202 rendered on the display 178 (FIG. 1) of a client 106 (FIG. 1) in the networked environment 100 (FIG. 1) according to various embodiments. Like FIG. 2G, a timeline interface 226 is presented in the user interface 202, and the timeline interface 226 of FIG. 2H provides additional information regarding a current scene 234. Unlike FIG. 2G, the user interface 202 completely obscures or covers over the video content feature 139 of FIG. 2G. Alternatively, the user interface 202 may be rendered on a different display 178. A picture-in-picture interface 250 may be provided to show a representative image or to preview the current scene 234.

In other examples, the timeline component 226 may indicate scenes which have been bookmarked by the user. Further, a user may bookmark a scene using a control in the user interface 202. The bookmark may be reported to the content delivery service 115 (FIG. 1) and recorded in the bookmarks 175 (FIG. 1). Bookmarks 175 may correspond to multiple different bookmark types. For example, a user may indicate a funny scene, a scary scene, a scene with a favorite song, and so on.

Additionally, the timeline component 226 may indicate popular or favorite scenes which have frequently been bookmarked by other users or a group of users. The subset of the scenes may be determined to be popular when they are associated with a bookmark frequency meeting a threshold for a group of users. Subsets of the scenes may be grouped together according to common characteristics, e.g., favorite funny moments, favorite soundtrack song segments, and so on. Such subsets may be editorially classified and/or automatically classified through clustering algorithms and known shared characteristics. Further, such subsets may be determined through types of bookmarks 175. Again, where a subset of the scenes is presented in the timeline component 228, functionality may be provided to play the subset of the scenes sequentially. To this end, the user interface 202 may include a sequential play component, the selection of which launces the sequential play of the subset of the scenes. It is noted that such scenes may be non-contiguous.

Figure 2I:
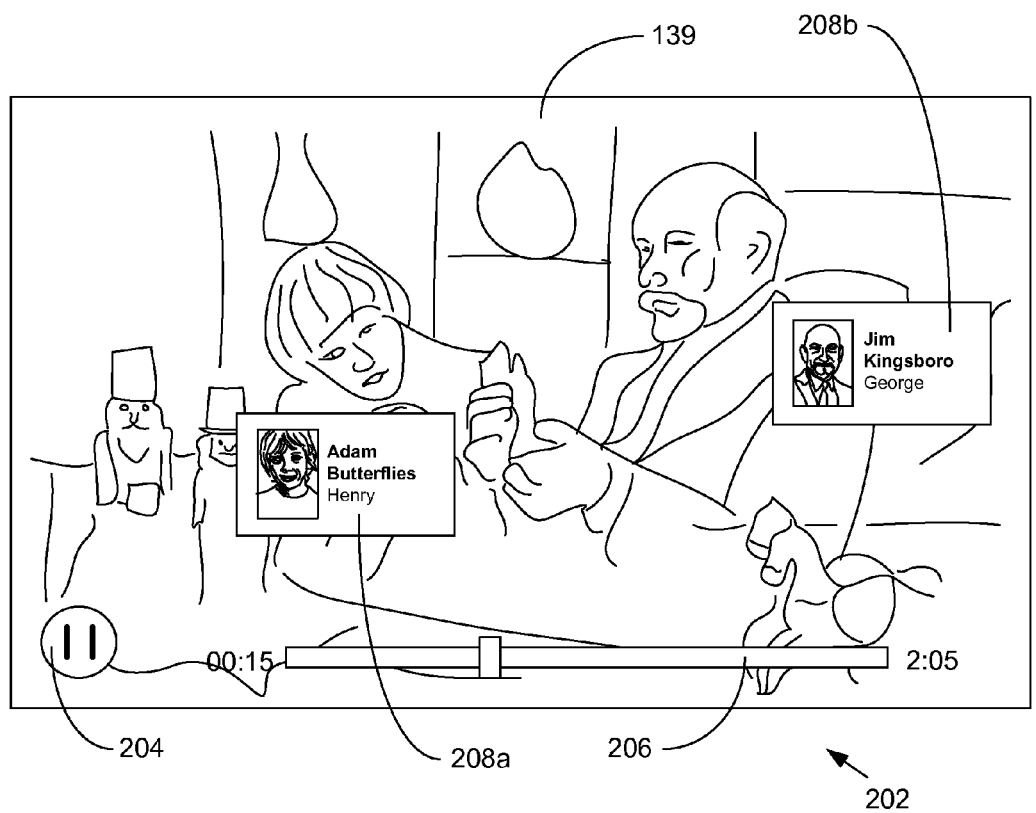

With reference to FIG. 2I, shown is one example of a user interface 202 rendered on top of the video content feature 139 on the display 178 (FIG. 1) of a client 106 (FIG. 1) in the networked environment 100 (FIG. 1) according to various embodiments. FIG. 2I corresponds to a variation on FIG. 2B where separate cast member selection components 208a and 208b are rendered for each of the cast members who are currently on screen. The cast member selection components 208a and 208b may be rendered relative to a position of the respective cast member within the video frame, according to positional data encoded within the scene data 145 (FIG. 1). In other examples, cast member selection components 208 for cast members who appear within a scene but are currently not on screen may be rendered on the side, at the top, at the bottom, or at another location on the screen. The location of the cast member selection components 208 may be personalized based at least in part on a user's configured preferences, past behavior (ignoring or selecting the cast member selection components), and/or other user profile data 136.

Figure 3:
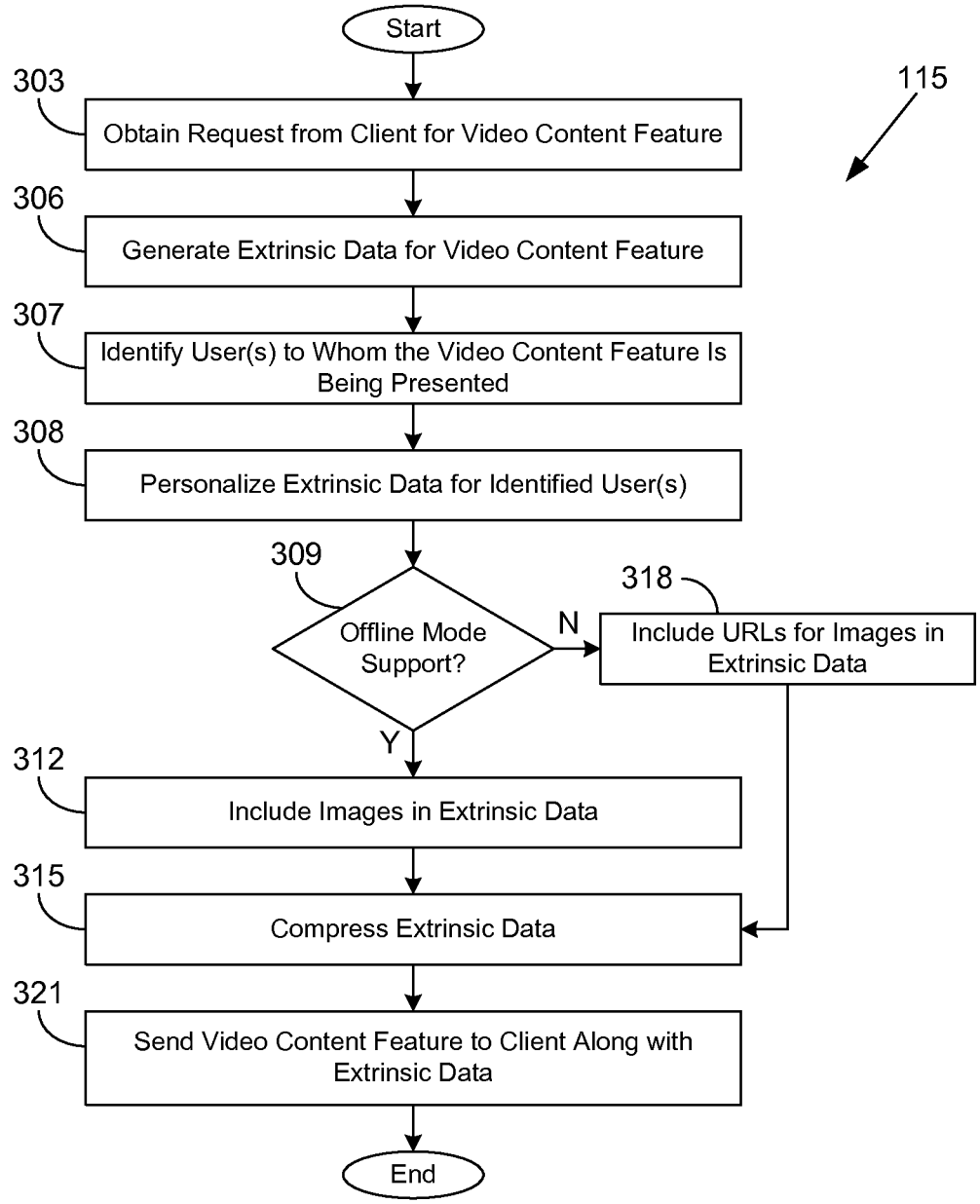
FIG. 3 is a flowchart illustrating one example of functionality implemented as portions of a content delivery service executed in a computing environment in the networked environment of FIG. 1 according to various embodiments of the present disclosure.

Referring next to FIG. 3, shown is a flowchart that provides one example of the operation of a portion of the content delivery service 115 according to various embodiments. It is understood that the flowchart of FIG. 3 provides merely an example of the many different types of functional arrangements that may be employed to implement the operation of the portion of the content delivery service 115 as described herein. As an alternative, the flowchart of FIG. 3 may be viewed as depicting an example method implemented in the computing environment 103 (FIG. 1) according to one or more embodiments.

Beginning with box 303, the content delivery service 115 obtains a request from a client 106 (FIG. 1) for a video content feature 139 (FIG. 1). The content delivery service 115 may then determine whether the client 106 has a right to access the video content feature 139. The content delivery service 115 may deny access to the video content feature 139 if the client 106 does not have the corresponding right. In box 306, the content delivery service 115 employs the extrinsic data generation service 118 (FIG. 1) to generate a collection of extrinsic data for the video content feature 139. The extrinsic data generation service 118 may generate the extrinsic data depending on one or more external sources of data. In some cases, the content delivery service 115 may utilize a cached version of the extrinsic data collection if regeneration is not to be performed.

In box 307, the content delivery service 115 identifies one or more users to whom the video content feature 139 is being presented. For example, the client 106 may be registered or otherwise associated with one or more users. In addition, the client 106 may be in proximity to one or more other users associated with personal mobile clients 110 (FIG. 1), which may be discovered via network communications with the clients 106. For example, the personal mobile clients 110 may be in the same room or area as the client 106 that is rendering a video content feature 139. That the personal mobile clients 110 are in the same area may be discovered by correlation of global positioning system (GPS) components, communication via personal area network (PAN) or local area network (LAN) technologies, or by way of direct configuration. The discovered personal mobile clients 110 may be associated with specific users, who are then considered to be identified. In box 308, the content delivery service 115 personalizes the extrinsic data based at least in part on user profile data 136 (FIG. 1) associated with the identified users. For example, extrinsic data may be included, excluded, ranked, given a relative prominence, etc. based at least in part on past user behavior, explicitly configured user preferences, and/or other factors.

In box 309, the content delivery service 115 determines whether the client 106 is to support an offline mode. If the client 106 supports the offline mode, in box 312, the content delivery service 115 includes images in the extrinsic data, such as cast member images and scene images. The content delivery service 115 continues to box 315. If the client 106 does not support the offline mode, the content delivery service 115 instead proceeds from box 309 to box 318 and includes URLs for the images in the extrinsic data. Thus, the client 106 may obtain the images on an as-needed basis when online. The content delivery service 115 continues to box 315.

In box 315, the content delivery service 115 may compress the generated collection of extrinsic data. In box 321, the content delivery service 115 sends the video content feature 139 (or an initial portion thereof) to the client 106 along with the collection of extrinsic data relevant to the video content feature 139. The extrinsic data may be sent automatically or in response to a further request from the client 106. It is noted that the extrinsic data may be sent within the same network stream as the video content feature 139 or through a different network stream. Further, in some cases, the extrinsic data may be sent without the video content feature 139. Thereafter, the portion of the content delivery service 115 ends.

Figure 4A:
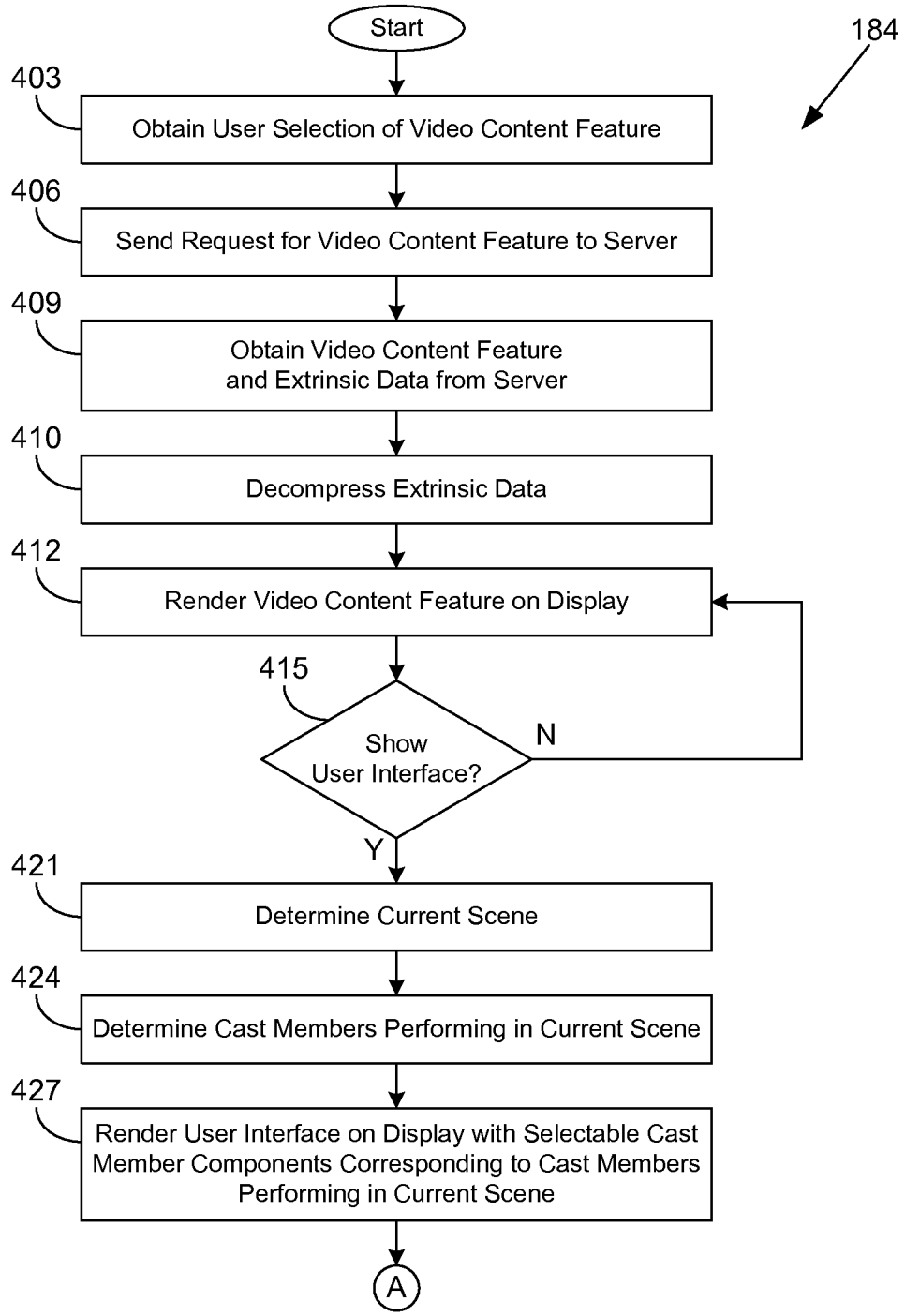
Figure 4B:
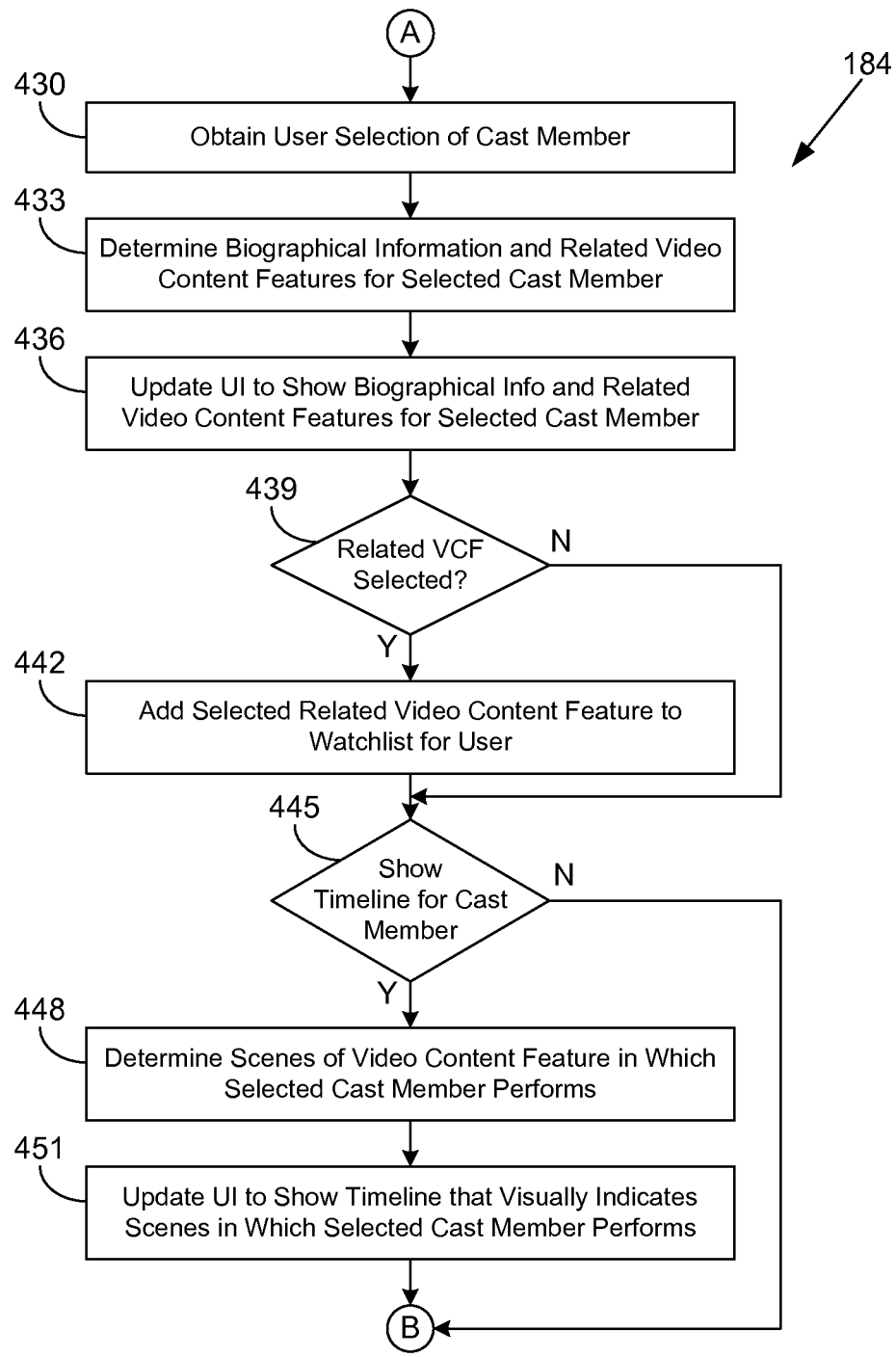

Continuing on to FIGS. 4A-4C, shown is a flowchart that provides one example of the operation of a portion of the content access application 184 according to various embodiments. It is understood that the flowchart of FIGS. 4A-4C provides merely an example of the many different types of functional arrangements that may be employed to implement the operation of the portion of the content access application 184 as described herein. As an alternative, the flowchart of FIGS. 4A-4C may be viewed as depicting an example method implemented in the client 106 (FIG. 1) according to one or more embodiments.

Beginning with box 403 of FIG. 4A, the content access application 184 obtains a user selection of a video content feature 139 (FIG. 1). In box 406, the content access application 184 sends a video content feature request 124 (FIG. 1) to the content delivery service 115 (FIG. 1). In box 409, the content access application 184 obtains the video content feature and extrinsic data 121 (FIG. 1) from the content delivery service 115 by way of the network 109 (FIG. 1). In box 410, the content access application 184 may decompress the extrinsic data, if it is compressed. If the content access application 184 supports an offline mode, the extrinsic data may contain all images and data used to render user interfaces 202. If an offline mode is not supported, the content access application 184 may request and obtain additional images and/or other data from the content delivery service 115 or other servers as needed. In box 412, the content access application 184 begins rendering the video content feature 139 on a display 178 (FIG. 1).

In box 415, the content access application 184 determines whether the user interface 202 (FIGS. 2B-2H) is to be shown. If the user interface 202 is not to be shown, the content access application 184 returns to box 412 and continues to render the video content feature 139. If the user interface 202 is to be shown, the content access application 184 continues to box 421.

In box 421, the content access application 184 determines the current scene. In box 424, the content access application 184 determines the cast members who perform or are performing in the current scene. In one embodiment, the cast members who perform in the current scene may correspond to the cast members who have appeared so far up to a current time in the current scene. In box 427, the content access application 184 renders the user interface 202 on the display 178 with selectable cast member components 222 (FIGS. 2D-2E) and/or a cast member selection component 208 (FIGS. 2B-2F).

The content of the user interface 202 may be personalized based at least in part on user profile data 136 (FIG. 1) associated with one or more users who are identified as viewing the video content feature 139. For example, selectable cast member components 222 may be included, excluded, arranged in a particular ranked order, given a certain emphasis or relative prominence, and so on, based at least in part on past user behavior, configured preferences, and/or other user profile data 136.

In box 430 of FIG. 4B, the content access application 184 obtains a user selection of a cast member. In box 433, the content access application 184 determines biographical information 216 (FIG. 2C) and related video content features 139 for the selected cast member. In box 436, the content access application 184 updates the user interface 202 as in FIG. 2C to show the biographical information 216 and related video content feature selection components 220 (FIG. 2C) for the selected cast member. Additional images or other information may be presented as well. Which categories of information are presented and how they are rendered in the user interface 202 may be personalized based at least in part on the user profile data 136.

In box 439, the content access application 184 determines whether a related video content feature selection component 220 has been selected. If a related video content feature selection component 220 has been selected, the content access application 184 proceeds to box 442 and adds the selected related video content feature 139 to a watch list or other content list 166 (FIG. 1) for the user. The content access application 184 may also initiate an acquisition of the related video content feature 139 for the user. The content access application 184 continues to box 445. If no related video content feature selection component 220 is selected, the content access application 184 also continues to box 445.

In box 445, the content access application 184 determines whether to show a timeline interface 226 as in FIG. 2F for a cast member. The determination may be based at least in part on the user profile data 136 for the identified user(s). If so, in box 448, the content access application 184 determines the scenes of the video content feature 139 in which the cast member performs from the scene data 145 (FIG. 1). In box 451, the content access application 184 updates the user interface 202 as in FIG. 2F to show a timeline component 228 (FIG. 2F) that visually indicates the scenes in which the selected cast member performs. The content access application 184 continues to box 454 of FIG. 4C. If the timeline interface 226 is not to be shown for the cast member, the content access application 184 also continues to box 454 of FIG. 4C.

In box 454 of FIG. 4C, the content access application 184 determines whether to show a timeline interface 226 for a current scene (or other scene). If so, the content access application 184 moves to box 457 and updates the user interface 202 to show a timeline interface 226 with the current scene 234 indicated as in FIGS. 2G and 2H. In box 460, the content access application 184 determines whether the user has requested to jump to another scene. If the user has requested to jump to another scene, the content access application 184 cues the video content feature 139 to the other scene in box 463. The content access application 184 continues to box 466. If the user has not requested to jump to the other scene or if the timeline interface 226 is not shown for the current scene, the content access application 184 also proceeds to box 466.

In box 466, the content access application 184 determines whether to show quotations 247 (FIGS. 2G-2H) for the current scene 234. Such a determination may be based at least in part on the user profile data 136, i.e., whether the user has demonstrated an interest in quotations 247. If quotations 247 are to be shown, the content access application 184 updates the user interface 202 in box 469 to show the quotations 247. The same process may be performed for other scene-specific data such as trivia, goofs, and so on. The content access application 184 then continues to box 472. If quotations 247 are not to be shown, the content access application 184 also continues to box 472.

In box 472, the content access application 184 determines whether to promote products related to the current scene 234. If so, in box 475, the content access application 184 updates the user interface 202 to promote the products. Whether to promote products and which products to be promoted may be based at least in part on user purchase history, user browse history, and/or other data in the user profile data 136. The content access application 184 continues to box 478. If products are not to be promoted, the content access application 184 also continues to box 478.

In box 478, the content access application 184 determines whether to identify and promote audio tracks used in or related to the current scene 234. Such a determination may be based at least in part on the user profile data 136, i.e., whether the user has demonstrated an interest in audio tracks, and in particular, the type of audio tracks involved (e.g., genre, beat characteristics, artist, and/or other audio track characteristics). If so, the content access application 184 moves to box 481 and updates the user interface 202 as in FIGS. 2G and 2H to promote audio tracks for the current scene 234. The content access application 184 continues to box 484. If audio is not to be promoted, the content access application 184 also continues to box 484.

In box 484, the content access application 184 obtains a user request to resume the video content feature 139. For example, the user may tap or swipe outside of the user interface 202, the user may select a play control 212 (FIGS. 2C-2F), the user may explicitly dismiss the user interface 202, select a device back button, or perform some other action. In box 487, the content access application 184 hides the user interface 202 and continues rendering the video content feature 139. The user interface 202 may be hidden immediately or after a predetermined time period. Thereafter, the portion of the content access application 184 ends.

Figure 5:
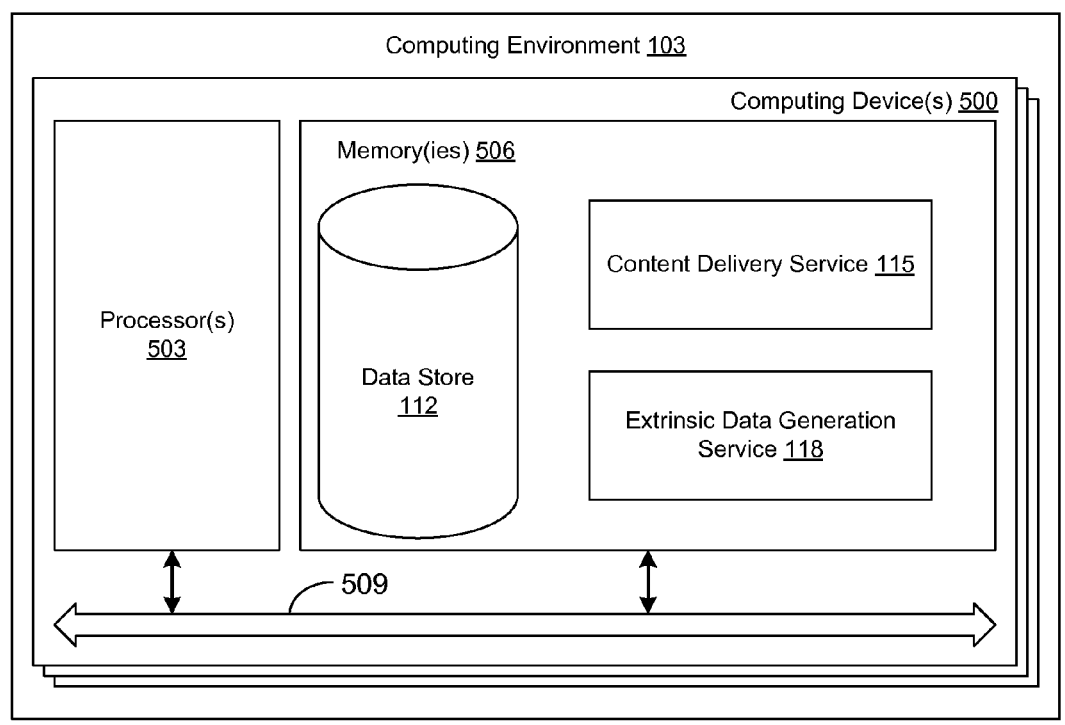
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are a content delivery service 115, an extrinsic data generation service 118, and potentially other applications. Also stored in the memory 506 may be a data store 112 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the content delivery service 115, the extrinsic data generation service 118, the content access application 184 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-4C show the functionality and operation of an implementation of portions of the content delivery service 115 and the content access application 184. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3-4C show a specific order of execution, it is understood that the order of execution may differ from that which is depicted. For example, the order of execution of two or more blocks may be scrambled relative to the order shown. Also, two or more blocks shown in succession in FIGS. 3-4C may be executed concurrently or with partial concurrence. Further, in some embodiments, one or more of the blocks shown in FIGS. 3-4C may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 115, the extrinsic data generation service 118, and the content access application 184, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content delivery service 115, the extrinsic data generation service 118, and the content access application 184, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the program having instructions that when executed cause the at least one computing device to perform a method comprising:
   causing a video content feature to be rendered on a display;
   causing a user interface to be rendered on top of the video content feature on the display, the user interface configured to present a plurality of cast member images, a first count of scenes in which a particular cast member appears as a first character, and a second count of scenes in which the particular cast member appears as a second character, wherein individual ones of the plurality of cast member images correspond to a respective cast member in the video content feature;
   determining at least one user to whom the video content feature is being presented; and
   in response to receiving a selection of one of the plurality of cast member images, updating the user interface to present a ranked filmography for the respective cast member corresponding to the selection of the one of the plurality of cast member images, the ranked filmography being arranged in a ranked order based at least in part on whether the at least one user has expressed an interest in individual ones of a plurality of video content features in the ranked filmography.

2. The non-transitory computer-readable medium of claim 1, the method further comprising customizing a prominence of content within the user interface based at least in part on profile data associated with the at least one user.

3. The non-transitory computer-readable medium of claim 1, wherein the first count of scenes is rendered in the user interface in response to a selection of one of the plurality of cast member images corresponding to the particular cast member as the first character, and the second count of scenes is rendered in the user interface in response to a selection of another one of the plurality of cast member images corresponding to the particular cast member as the second character.

4. A system, comprising:
   a data store; and
   at least one computing device in communication with the data store, the at least one computing device being configured to at least:
   cause a video content feature to be rendered on a display;
   cause a user interface to be rendered on top of the video content feature on the display, the user interface configured to present a plurality of cast member indicia, a first count of scenes in which a particular cast member appears as a first character, and a second count of scenes in which the particular cast member appears as a second character, wherein individual ones of the plurality of cast member indicia corresponding to a respective cast member in the video content feature; and
   in response to receiving a selection of one of the plurality of cast member indicia from a user, update the user interface to present additional information regarding the respective cast member corresponding to the selection of the one of the plurality of cast member indicia, the additional information being personalized based at least in part on profile data associated with the user.

5. The system of claim 4, wherein the additional information includes a listing of a plurality of other video content features in which the respective cast member performs.

6. The system of claim 5, wherein the at least one computing device is further configured to:
calculate a plurality of weights individually corresponding to the plurality of other video content features, individual ones of the plurality of weights being based at least in part on a first value when the user has purchased a corresponding other video content feature and a second value when the user has rented the corresponding other video content feature, the first value being greater than the second value; and
select the plurality of other video content features in which the respective cast member performs based at least in part on the plurality of weights.

7. The system of claim 5, wherein the at least one computing device is further configured to generate a respective ranking for individual ones of the plurality of other video content features in which the respective cast member performs based at least in part on the profile data associated with the user, wherein the listing is sorted based at least in part on the respective ranking.

8. The system of claim 7, wherein the respective ranking for the individual ones of the plurality of other video content features in which the respective cast member performs is generated further based in part on a respective overall popularity of the individual ones of the plurality of other video content features in which the respective cast member performs.

9. The system of claim 4, wherein the profile data associated with the user includes a view history indicating a plurality of video content features that were previously viewed by the user.

10. The system of claim 4, wherein the profile data associated with the user includes a purchase history indicating a plurality of video content features that were previously purchased by the user.

11. The system of claim 4, wherein the at least one computing device is further configured to select a category of additional information from a plurality of categories of additional information based at least in part on the profile data associated with the user.

12. The system of claim 4, wherein the additional information is personalized with respect to a relative prominence of the additional information upon the display.

13. The system of claim 4, wherein the plurality of cast members comprises a first plurality of cast members who perform in the video content feature and a second plurality of cast members who provide vocals for the video content feature, and the user interface is further configured to present a first subset of the plurality of cast member indicia corresponding to the first plurality of cast members and separately present a second subset of the plurality of cast member indicia corresponding to the second plurality of cast members.

14. The system of claim 4, wherein the at least one computing device is further configured to cause the user interface to present a subset of scenes corresponding to one of the plurality of cast member indicia including a sequential play component, the sequential play component configured to cause a sequential play of the subset of scenes.

15. A method, comprising:
causing, via at least one of one or more computing devices, a video content feature to be rendered on a display;
causing, via at least one of the one or more computing devices, a user interface to be rendered on top of the video content feature on the display, the user interface configured to present a plurality of cast member indicia, a first count of scenes in which a particular cast member appears as a first character, and a second count of scenes in which the particular cast member appears as a second character, wherein individual ones of the plurality of cast member indicia corresponding to a respective cast member in the video content feature;
determining, via at least one of the one or more computing devices, a plurality of users who are in proximity to the display while the video content feature is being rendered; and
responsive to receiving a selection of one of the plurality of cast member indicia from one of the plurality of users, updating, via at least one of the one or more computing devices, the user interface to present additional information regarding the respective cast member corresponding to the selection of the one of the plurality of cast member indicia, the additional information being personalized based at least in part on profile data associated with the plurality of users.

16. The method of claim 15, further comprising arranging, via at least one of the one or more computing devices, the plurality of cast member indicia in a ranked order based at least in part on the profile data associated with the plurality of users.

17. The method of claim 15, wherein determining the plurality of users who are in proximity to the display while the video content feature is being rendered further comprises discovering, via at least one of the one or more computing devices, a plurality of personal mobile devices in proximity to the display via a wireless data connection to the plurality of personal mobile devices, wherein individual ones of the plurality of personal mobile devices correspond to a respective one of the plurality of users.

18. The method of claim 15, further comprising generating, via at least one of the one or more computing devices, a ranked filmography of the respective cast member based at least in part on the profile data of the plurality of users, wherein the additional information comprises the ranked filmography.

19. The method of claim 18, wherein generating the ranked filmography further comprises sequencing, via at least one of the one or more computing devices, individual ones of a plurality of video content features within the ranked filmography based at least in part on whether individual ones of the plurality of users have expressed an interest in the individual ones of the plurality of video content features.

20. The method of claim 15, further comprising personalizing, via at least one of the one or more computing devices, the additional information by selectively including or excluding categories of the additional information based at least in part on the profile data of the plurality of users.

\* \* \* \* \*